US012771430B2

(12) United States Patent
Jassal et al.

(10) Patent No.: US 12,771,430 B2
(45) Date of Patent: Oct. 20, 2026

(54) INITIAL ACCESS PROCEDURE FOR HAPS

(71) Applicant: Huawei Technologies Co., Ltd., Shenzhen (CN)

(72) Inventors: Aman Jassal, Stittsville (CA); Amine Maaref, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/822,897

(22) Filed: Sep. 3, 2024

(65) Prior Publication Data

US 2025/0038819 A1 Jan. 30, 2025

Related U.S. Application Data

(63) Continuation of application No. PCT/CN2022/079051, filed on Mar. 3, 2022.

(51) Int. Cl.

*H04B 7/06* (2006.01)
*H04W 16/28* (2009.01)
*H04W 74/0833* (2024.01)

(52) U.S. Cl.

CPC .......... *H04B 7/0695* (2013.01); *H04W 16/28* (2013.01); *H04W 74/0833* (2013.01)

(58) Field of Classification Search

CPC .. H04B 7/0695; H04B 7/0617; H04B 7/0456; H04B 7/06952; H04W 16/28; H04W 74/0833; H04W 74/0836; H04W 74/0838; H04W 64/00; H04W 4/02; H04W 4/023; H04W 4/029; H04W 4/025

See application file for complete search history.

(56) References Cited

U.S. PATENT DOCUMENTS

| | | | | |
|---|---|---|---|---|
| 11,129,200 | B2 | 9/2021 | Takeda et al. | |
| 11,224,077 | B2 | 1/2022 | Lei et al. | |
| 2017/0104517 | A1* | 4/2017 | Kakishima | H04B 7/0456 |
| 2017/0181193 | A1 | 6/2017 | Park | |
| 2019/0097712 | A1 | 3/2019 | Singh et al. | |
| 2024/0324018 | A1* | 9/2024 | Ma | H04B 7/0695 |

FOREIGN PATENT DOCUMENTS

| | | | |
|---|---|---|---|
| CN | 109479330 | A | 3/2019 |
| CN | 111726820 | A | 9/2020 |
| CN | 114080775 | A | 2/2022 |
| JP | 4731000 | B2 * | 7/2011 |
| WO | 2021156749 | A1 | 8/2021 |
| WO | 2022031562 | A1 | 2/2022 |

* cited by examiner

*Primary Examiner* — Sophia Vlahos
(74) *Attorney, Agent, or Firm* — Slater Matsil, LLP

(57) ABSTRACT

Some embodiments of the present disclosure provide initial access procedures that allow a UE to become connected to a non-terrestrial transmit-receive point, such as a device in a high altitude platform system. Through receipt of a positioning reference signal, a UE may determine its own location coordinates. Then, using the location coordinates, the UE may select a beam using a set of parameters associated, in a table, with the location coordinates. The UE may then use the selected beam to carry out an initial access procedure with the non-terrestrial transmit-receive point.

18 Claims, 19 Drawing Sheets

1000

| LATITUDE RANGE (IN DEGREES) | LONGITUDE RANGE (IN DEGREES) | CANDIDATE VALUES FOR $C$ | CANDIDATE VALUES FOR $M_1$ |
|---|---|---|---|
| [40;42] | [41;42] | {10} | {2} |

FIG. 10

1200

| LATITUDE RANGE [DEGREES] | LONGITUDE RANGE [DEGREES] | CANDIDATE VALUES FOR C | CANDIDATE VALUES FOR $M_1$ |
|---|---|---|---|
| [36;40] | [42;46] | {40} | {4} |
| [40;42] | [43;46] | {10} | {0} |
| [42:44] | [43;46] | {10} | {1} |
| [41;43] | [40;43] | {10} | {2} |
| [43;45] | [40;43] | {10} | {3} |

FIG. 12

1500

| LATITUDE RANGE [DEGREES] | LONGITUDE RANGE [DEGREES] | CANDIDATE VALUES FOR $M_1$ |
|---|---|---|
| [40;47] | [40;47] | {0, 1, 2, 3} |
| [43;49] | [33;40] | {4, 5, 6, 7} |

FIG. 15

1600

| LATITUDE RANGE [DEGREES] | LONGITUDE RANGE [DEGREES] | CANDIDATE VALUES FOR C | CANDIDATE VALUES FOR $M_1$ |
|---|---|---|---|
| [40;42] | [43;46] | {10} | {0} |
| [42:44] | [43;46] | {10} | {1} |
| [41;43] | [40;43] | {10} | {2} |
| [43;45] | [40;43] | {10} | {3} |
| [42;44] | [38;40] | {10} | {4} |
| [44;46] | [38;40] | {10} | {5} |
| [43;45] | [36;38] | {10} | {6} |
| [44;46] | [36;38] | {10} | {7} |

FIG. 16

INITIAL ACCESS PROCEDURE FOR HAPS

CROSS-REFERENCE TO RELATED APPLICATIONS

This application is a continuation of International Application No. PCT/CN2022/079051, filed on Mar. 3, 2022, which is hereby incorporated by reference in its entirety.

TECHNICAL FIELD

The present disclosure relates, generally, to initial access procedures in wireless communication networks and, in particular embodiments, to initial access procedures for use with high altitude platform systems (HAPS).

BACKGROUND

Current solutions for initial access procedures in wireless communication (cellular) systems are based on procedures defined in the known Long Term Evolution (LTE). The LTE standard was finalized in December 2008. The term "initial access" refers to a set of four physical layer functions: a cell search function; a cell selection function; a system information acquisition function; and a random access function. The initial access functions are typically initiated when a user equipment (a "UE") is in an IDLE state or an INACTIVE state. The goal of initial access is to allow the UE to transition to a CONNECTED state to a transmit-receive point.

SUMMARY

Aspects of the present application relate to initial access procedures that allow a UE to become connected to a non-terrestrial transmit-receive point, such as a device in a high altitude platform system. Through receipt of a positioning reference signal, a UE may determine its own location coordinates. Then, using the location coordinates, the UE may select a beam using a set of parameters associated, in a table, with the location coordinates. The UE may then use the selected beam to carry out an initial access procedure with the non-terrestrial transmit-receive point.

Due to time division multiplexing separation of beams, known initial access solutions, for allowing a UE to transition to a CONNECTED state with a transmit-receive point, may be considered to be inherently time-consuming and spectrally wasteful.

By using its own location coordinates to narrow down the potential beams, aspects of the present application may be considered to increase time efficiency and to increase spectral efficiency.

According to an aspect of the present disclosure, there is provided a method for selecting a beam at a device. The method includes obtaining location coordinates for the device, determining, on the basis of the obtained location coordinates for the device, a selected beam index, from among a plurality of beam indices and transmitting, on the basis of the selected beam index, a random access preamble.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 10 illustrates an example entry in a table mapping location coordinate ranges to values for beam-group size and beam-group index, in accordance with aspects of the present application;

FIG. 12 illustrates a table that includes a mapping of latitude and longitude ranges to parameter values for beam-group size and beam-group index, in accordance with aspects of the present application;

FIG. 15 illustrates an example table mapping location coordinates to a plurality of values for beam-group index, in accordance with aspects of the present application;

FIG. 16 illustrates a frequency-band-specific table that includes a mapping of latitude and longitude ranges to parameter values for beam-group size and beam-group index, in accordance with aspects of the present application;

DETAILED DESCRIPTION OF THE EMBODIMENTS

For illustrative purposes, specific example embodiments will now be explained in greater detail in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include, or otherwise have access to, a non-transitory computer/processor readable storage medium or media for storage of information, such as computer/processor readable instructions, data structures, program modules and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e., DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Figure 1:
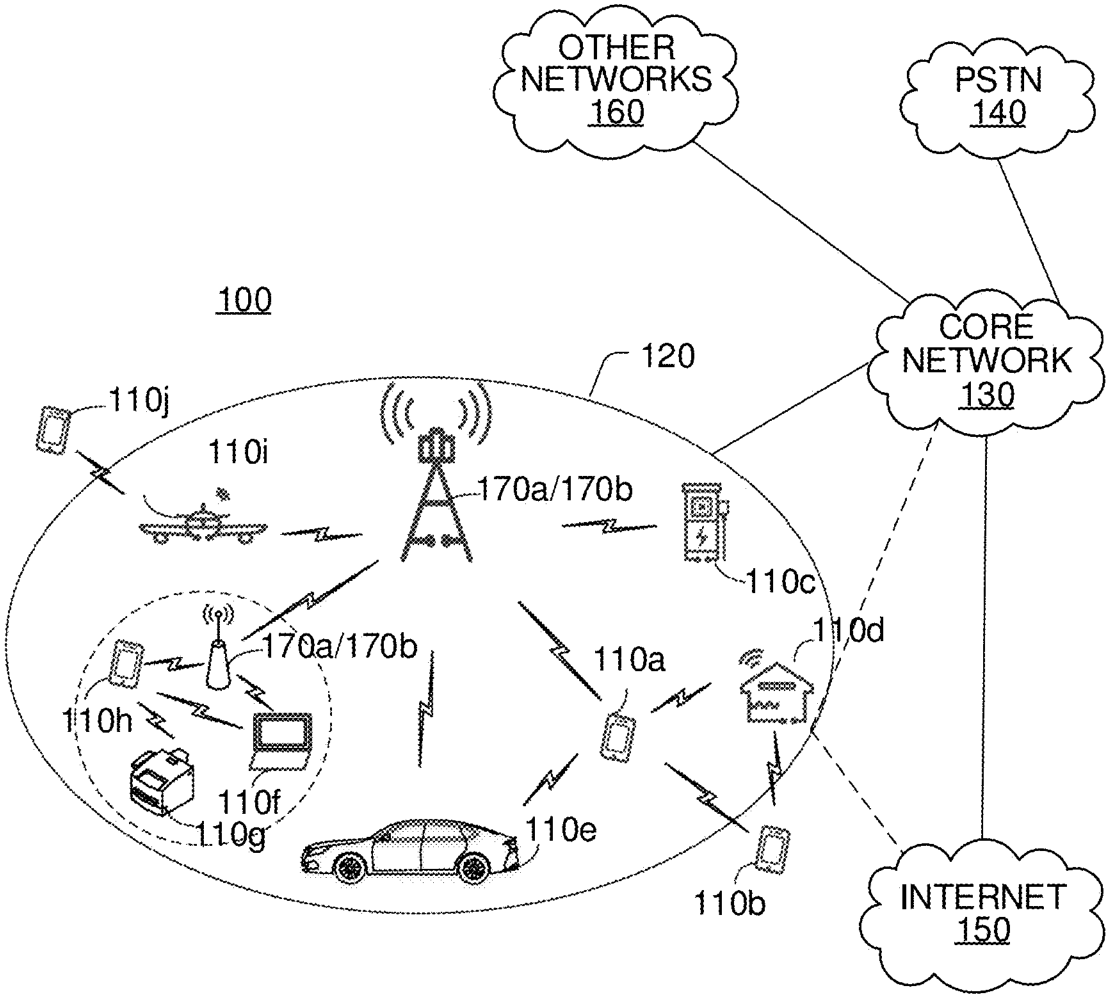
FIG. 1 illustrates, in a schematic diagram, a communication system in which embodiments of the disclosure may occur, the communication system includes multiple example electronic devices and multiple example transmit receive points along with various networks.

Referring to FIG. 1, as an illustrative example without limitation, a simplified schematic illustration of a communication system is provided. The communication system 100 comprises a radio access network 120. The radio access network 120 may be a next generation (e.g., sixth generation, "6G," or later) radio access network, or a legacy (e.g., 5G, 4G, 3G or 2G) radio access network. One or more communication electric device (ED) 110*a*, 110*b*, 110*c*, 110*d*, 110*e*, 110*f*, 110*g*, 110*h*, 110*i*, 110*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
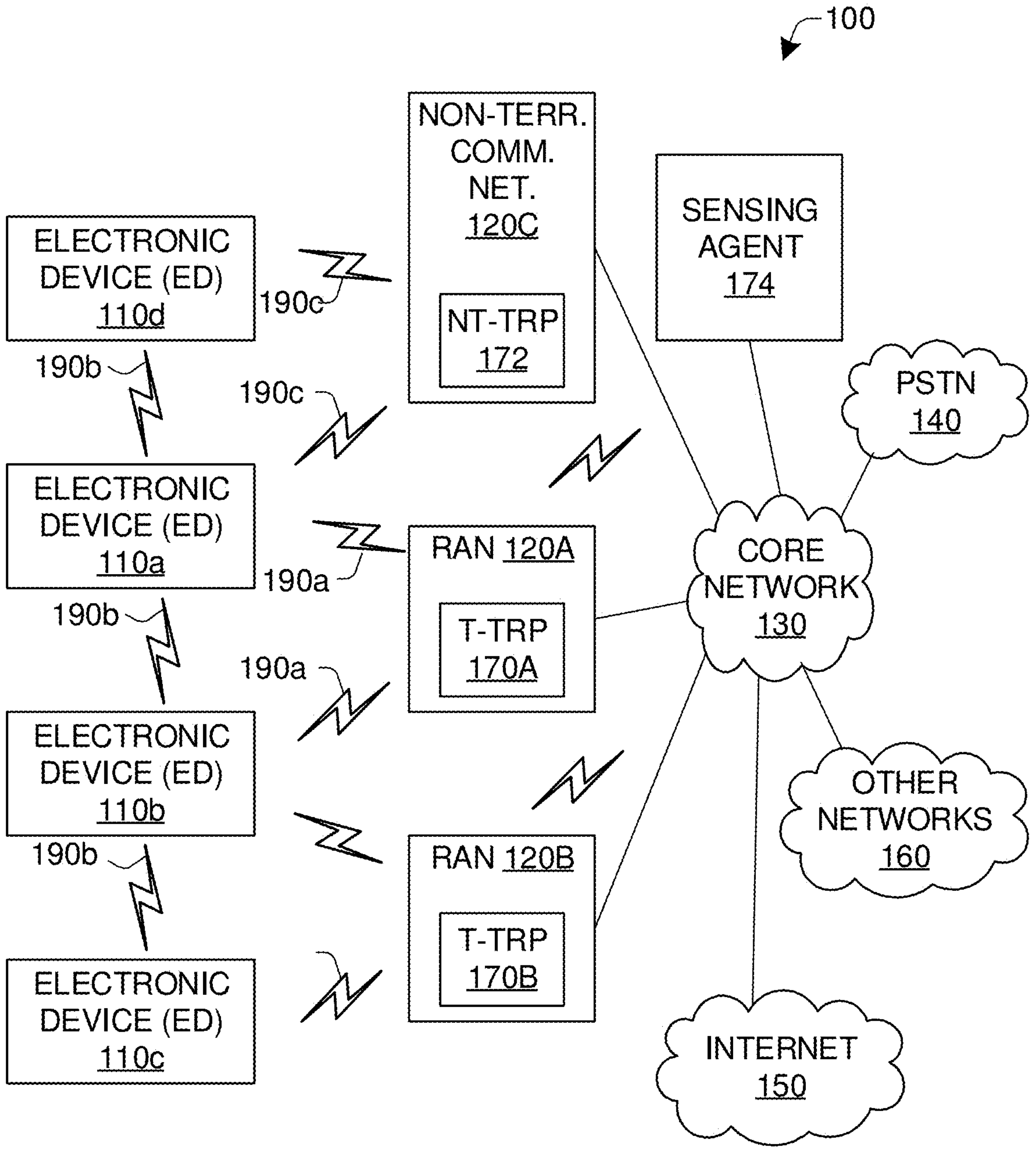
FIG. 2 illustrates, in a block diagram, the communication system of FIG. 1, the communication system includes multiple example electronic devices, an example terrestrial transmit receive point and an example non-terrestrial transmit receive point along with various networks.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of a terrestrial communication system and a non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing and faster physical layer link switching between terrestrial networks and non-terrestrial networks.

The terrestrial communication system and the non-terrestrial communication system could be considered sub-systems of the communication system. In the example shown in FIG. 2, the communication system 100 includes electronic devices (ED) 110*a*, 110*b*, 110*c*, 110*d* (generically referred to as ED 110), radio access networks (RANs) 120*a*, 120*b*, a non-terrestrial communication network 120*c*, a core network 130, a public switched telephone network (PSTN) 140, the Internet 150 and other networks 160. The RANs 120*a*, 120*b* include respective base stations (BSs) 170*a*, 170*b*, which may be generically referred to as terrestrial transmit and receive points (T-TRPs) 170*a*, 170*b*. The non-terrestrial communication network 120*c* includes an access node 172, which may be generically referred to as a non-terrestrial transmit and receive point (NT-TRP) 172.

Any ED 110 may be alternatively or additionally configured to interface, access, or communicate with any T-TRP 170*a*, 170*b* and NT-TRP 172, the Internet 150, the core network 130, the PSTN 140, the other networks 160, or any combination of the preceding. In some examples, the ED 110*a* may communicate an uplink and/or downlink transmission over a terrestrial air interface 190*a* with T-TRP 170*a*. In some examples, the EDs 110*a*, 110*b*, 110*c* and 110*d* may also communicate directly with one another via one or more sidelink air interfaces 190*b*. In some examples, the ED 110*d* may communicate an uplink and/or downlink transmission over a non-terrestrial air interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), space division multiple access (SDMA), time division multiple access (TDMA), frequency division multiple access (FDMA), orthogonal FDMA (OFDMA), or single-carrier FDMA (SC- FDMA) in the air interfaces 190$a$ and 190$b$. The air interfaces 190$a$ and 190$b$ may utilize other higher dimension signal spaces, which may involve a combination of orthogonal and/or non-orthogonal dimensions.

The non-terrestrial air interface 190$c$ can enable communication between the ED 110$d$ and one or multiple NT-TRPs 172 via a wireless link or simply a link. For some examples, the link is a dedicated connection for unicast transmission, a connection for broadcast transmission, or a connection between a group of EDs 110 and one or multiple NT-TRPs 175 for multicast transmission.

The RANs 120$a$ and 120$b$ are in communication with the core network 130 to provide the EDs 110$a$, 110$b$, 110$c$ with various services such as voice, data and other services. The RANs 120$a$ and 120$b$ and/or the core network 130 may be in direct or indirect communication with one or more other RANs (not shown), which may or may not be directly served by core network 130 and may, or may not, employ the same radio access technology as RAN 120$a$, RAN 120$b$ or both. The core network 130 may also serve as a gateway access between (i) the RANs 120$a$ and 120$b$ or the EDs 110$a$, 110$b$, 110$c$ or both, and (ii) other networks (such as the PSTN 140, the Internet 150, and the other networks 160). In addition, some or all of the EDs 110$a$, 110$b$, 110$c$ may include functionality for communicating with different wireless networks over different wireless links using different wireless technologies and/or protocols. Instead of wireless communication (or in addition thereto), the EDs 110$a$, 110$b$, 110$c$ may communicate via wired communication channels to a service provider or switch (not shown) and to the Internet 150. The PSTN 140 may include circuit switched telephone networks for providing plain old telephone service (POTS). The Internet 150 may include a network of computers and subnets (intranets) or both and incorporate protocols, such as Internet Protocol (IP), Transmission Control Protocol (TCP), User Datagram Protocol (UDP). The EDs 110$a$, 110$b$, 110$c$ may be multimode devices capable of operation according to multiple radio access technologies and may incorporate multiple transceivers necessary to support such.

Figure 3:
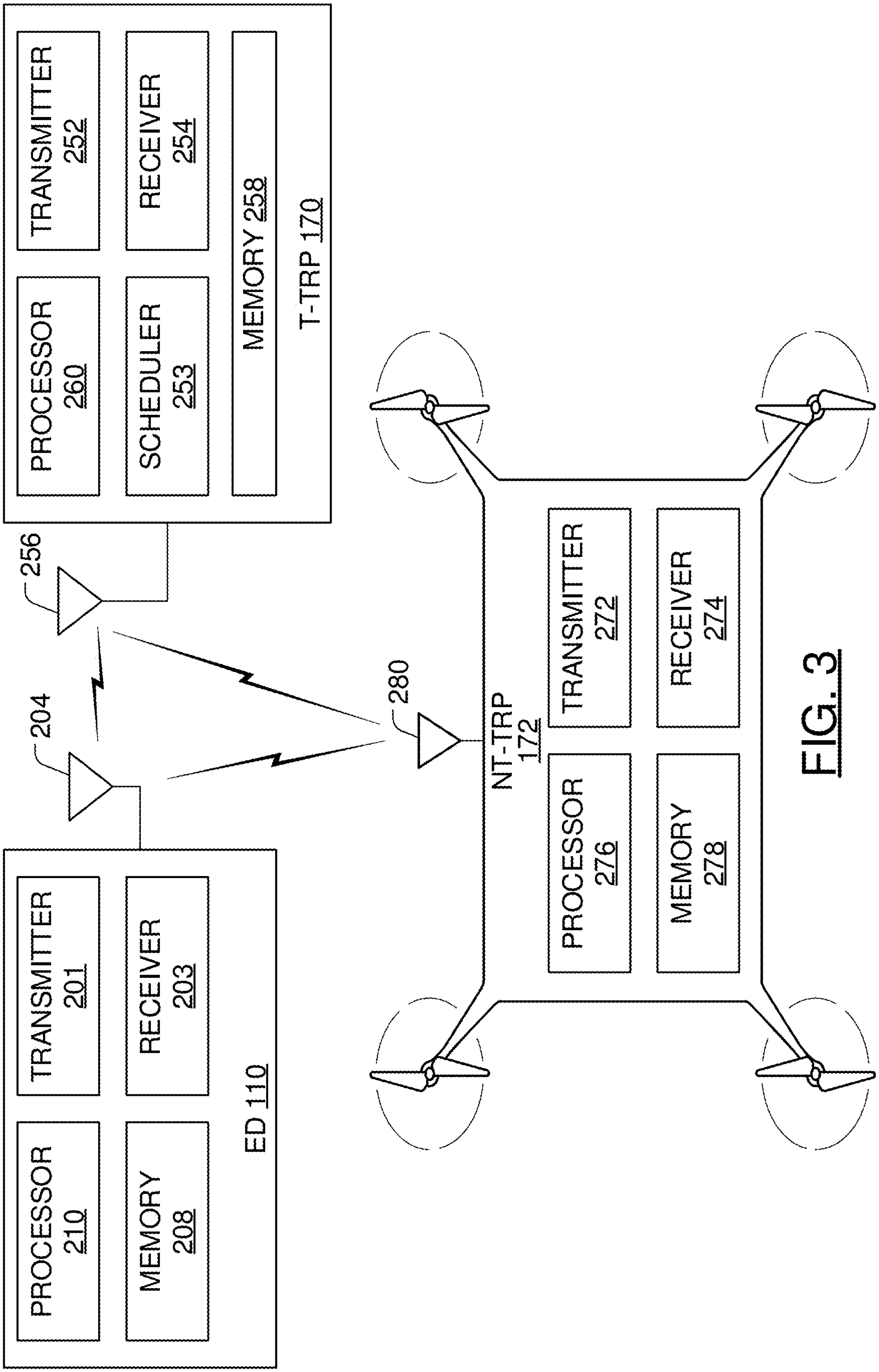
FIG. 3 illustrates, as a block diagram, elements of an example electronic device of FIG. 2, elements of an example terrestrial transmit receive point of FIG. 2 and elements of an example non-terrestrial transmit receive point of FIG. 2, in accordance with aspects of the present application.

FIG. 3 illustrates another example of an ED 110 and a base station 170$a$, 170$b$ and/or 170$c$. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), Internet of things (IoT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g., communication module, modem, or chip) in the forgoing devices, among other possibilities. Future generation EDs 110 may be referred to using other terms. The base stations 170$a$ and 170$b$ each T-TRPs and will, hereafter, be referred to as T-TRP 170. Also shown in FIG. 3, a NT-TRP will hereafter be referred to as NT-TRP 172. Each ED 110 connected to the T-TRP 170 and/or the NT-TRP 172 can be dynamically or semi-statically turned-on (i.e., established, activated or enabled), turned-off (i.e., released, deactivated or disabled) and/or configured in response to one of more of: connection availability; and connection necessity.

The ED 110 includes a transmitter 201 and a receiver 203 coupled to one or more antennas 204. Only one antenna 204 is illustrated. One, some, or all of the antennas 204 may, alternatively, be panels. The transmitter 201 and the receiver 203 may be integrated, e.g., as a transceiver. The transceiver is configured to modulate data or other content for transmission by the at least one antenna 204 or by a network interface controller (NIC). The transceiver may also be configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by one or more processing unit(s) (e.g., a processor 210). Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache and the like.

The ED 110 may further include one or more input/output devices (not shown) or interfaces (such as a wired interface to the Internet 150 in FIG. 1). The input/output devices permit interaction with a user or other devices in the network. Each input/output device includes any suitable structure for providing information to, or receiving information from, a user, such as through operation as a speaker, a microphone, a keypad, a keyboard, a display or a touch screen, including network interface communications.

The ED 110 includes the processor 210 for performing operations including those operations related to preparing a transmission for uplink transmission to the NT-TRP 172 and/or the T-TRP 170, those operations related to processing downlink transmissions received from the NT-TRP 172 and/or the T-TRP 170, and those operations related to processing sidelink transmission to and from another ED 110. Processing operations related to preparing a transmission for uplink transmission may include operations such as encoding, modulating, transmit beamforming and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g., by detecting and/or decoding the signaling). An example of signaling may be a reference signal transmitted by the NT-TRP 172 and/or by the T-TRP 170. In some embodiments, the processor 210 implements the transmit beamforming and/or the receive beamforming based on the indication of beam direction, e.g., beam angle information (BAI), received from the T-TRP 170. In some embodiments, the processor 210 may perform operations relating to network access (e.g., initial access) and/or downlink synchronization, such as operations relating to detecting a synchronization sequence, decoding and obtaining the system information, etc. In some embodiments, the processor 210 may perform channel estimation, e.g., using a reference signal received from the NT-TRP 172 and/or from the T-TRP 170.

Although not illustrated, the processor 210 may form part of the transmitter 201 and/or part of the receiver 203. Although not illustrated, the memory 208 may form part of the processor 210.

The processor 210, the processing components of the transmitter 201 and the processing components of the receiver 203 may each be implemented by the same or different one or more processors that are configured to execute instructions stored in a memory (e.g., the in memory 208). Alternatively, some or all of the processor 210, the processing components of the transmitter 201 and the processing components of the receiver 203 may each be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), a wireless router, a relay station, a remote radio head, a terrestrial node, a terrestrial network device, a terrestrial base station, a base band unit (BBU), a remote radio unit (RRU), an active antenna unit (AAU), a remote radio head (RRH), a central unit (CU), a distribute unit (DU), a positioning node, among other possibilities. The T-TRP 170 may be a macro BS, a pico BS, a relay node, a donor node, or the like, or combinations thereof. The T-TRP 170 may refer to the forgoing devices or refer to apparatus (e.g., a communication module, a modem or a chip) in the forgoing devices.

In some embodiments, the parts of the T-TRP 170 may be distributed. For example, some of the modules of the T-TRP 170 may be located remote from the equipment that houses antennas 256 for the T-TRP 170, and may be coupled to the equipment that houses antennas 256 over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment that houses antennas 256 of the T-TRP 170. The modules may also be coupled to other T-TRPs. In some embodiments, the T-TRP 170 may actually be a plurality of T-TRPs that are operating together to serve the ED 110, e.g., through the use of coordinated multipoint transmissions.

As illustrated in FIG. 3, the T-TRP 170 includes at least one transmitter 252 and at least one receiver 254 coupled to one or more antennas 256. Only one antenna 256 is illustrated. One, some, or all of the antennas 256 may, alternatively, be panels. The transmitter 252 and the receiver 254 may be integrated as a transceiver. The T-TRP 170 further includes a processor 260 for performing operations including those related to: preparing a transmission for downlink transmission to the ED 110; processing an uplink transmission received from the ED 110; preparing a transmission for backhaul transmission to the NT-TRP 172; and processing a transmission received over backhaul from the NT-TRP 172. Processing operations related to preparing a transmission for downlink or backhaul transmission may include operations such as encoding, modulating, precoding (e.g., multiple input multiple output, "MIMO," precoding), transmit beamforming and generating symbols for transmission. Processing operations related to processing received transmissions in the uplink or over backhaul may include operations such as receive beamforming, demodulating received symbols and decoding received symbols. The processor 260 may also perform operations relating to network access (e.g., initial access) and/or downlink synchronization, such as generating the content of synchronization signal blocks (SSBs), generating the system information, etc. In some embodiments, the processor 260 also generates an indication of beam direction, e.g., Beam Angular Information or BAI, which may be scheduled for transmission by a scheduler 253. The processor 260 performs other network-side processing operations described herein, such as determining the location of the ED 110, determining where to deploy the NT-TRP 172, etc. In some embodiments, the processor 260 may generate signaling, e.g., to configure one or more parameters of the ED 110 and/or one or more parameters of the NT-TRP 172. Any signaling generated by the processor 260 is sent by the transmitter 252. Note that "signaling," as used herein, may alternatively be called control signaling. Dynamic signaling may be transmitted in a control channel, e.g., a physical downlink control channel (PDCCH) and static, or semi-static, higher layer signaling may be included in a packet transmitted in a data channel, e.g., in a physical downlink shared channel (PDSCH).

The scheduler 253 may be coupled to the processor 260. The scheduler 253 may be included within, or operated separately from, the T-TRP 170. The scheduler 253 may schedule uplink, downlink and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or part of the receiver 254. Also, although not illustrated, the processor 260 may implement the scheduler 253. Although not illustrated, the memory 258 may form part of the processor 260.

The processor 260, the scheduler 253, the processing components of the transmitter 252 and the processing components of the receiver 254 may each be implemented by the same, or different one of, one or more processors that are configured to execute instructions stored in a memory, e.g., in the memory 258. Alternatively, some or all of the processor 260, the scheduler 253, the processing components of the transmitter 252 and the processing components of the receiver 254 may be implemented using dedicated circuitry, such as a FPGA, a GPU or an ASIC.

Notably, the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110; processing an uplink transmission received from the ED 110; preparing a transmission for backhaul transmission to T-TRP 170; and processing a transmission received over backhaul from the T-TRP 170. Processing operations related to preparing a transmission for downlink or backhaul transmission may include operations such as encoding, modulating, precoding (e.g., MIMO precoding), transmit beamforming and generating symbols for transmission. Processing operations related to processing received transmissions in the uplink or over backhaul may include operations such as receive beamforming, demodulating received signals and decoding received symbols. In some embodiments, the processor 276 implements the transmit beamforming and/or receive beamforming based on beam direction information (e.g., BAI) received from the T-TRP 170. In some embodiments, the processor 276 may generate signaling, e.g., to configure one or more parameters of the ED 110. In some embodiments, the NT-TRP 172 implements physical layer processing but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or part of the receiver 274. Although not illustrated, the memory 278 may form part of the processor 276.

The processor 276, the processing components of the transmitter 272 and the processing components of the receiver 274 may each be implemented by the same or different one or more processors that are configured to execute instructions stored in a memory, e.g., in the memory 278. Alternatively, some or all of the processor 276, the processing components of the transmitter 272 and the processing components of the receiver 274 may be implemented using dedicated circuitry, such as a programmed FPGA, a GPU or an ASIC. In some embodiments, the NT-TRP 172 may actually be a plurality of NT-TRPs that are operating together to serve the ED 110, e.g., through coordinated multipoint transmissions.

The T-TRP 170, the NT-TRP 172, and/or the ED 110 may include other components, but these have been omitted for the sake of clarity.

Figure 4:
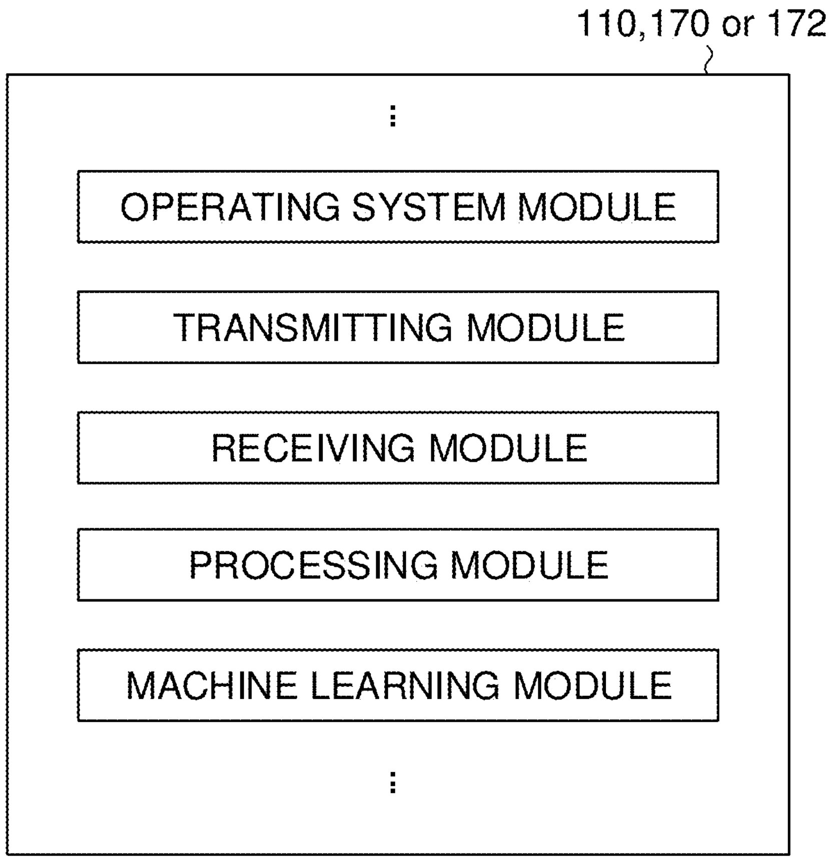
FIG. 4 illustrates, as a block diagram, various modules that may be included in an example electronic device, an example terrestrial transmit receive point and an example non-terrestrial transmit receive point, in accordance with aspects of the present application.

One or more steps of the embodiment methods provided herein may be performed by corresponding units or modules, according to FIG. 4. FIG. 4 illustrates units or modules in a device, such as in the ED 110, in the T-TRP 170 or in the NT-TRP 172. For example, a signal may be transmitted by a transmitting unit or by a transmitting module. A signal may be received by a receiving unit or by a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU or an ASIC. It will be appreciated that where the modules are implemented using software for execution by a processor, for example, the modules may be retrieved by a processor, in whole or part as needed, individually or together for processing, in single or multiple instances, and that the modules themselves may include instructions for further deployment and instantiation.

Additional details regarding the EDs 110, the T-TRP 170 and the NT-TRP 172 are known to those of skill in the art. As such, these details are omitted here.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g., data) over a wireless communications link. The wireless communications link may support a link between a radio access network and user equipment (e.g., a "Uu" link), and/or the wireless communications link may support a link between device and device, such as between two user equipments (e.g., a "sidelink"), and/or the wireless communications link may support a link between a non-terrestrial (NT)-communication network and user equipment (UE). The following are some examples for the above components.

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform and low Peak to Average Power Ratio Waveform (low PAPR WF).

A frame structure component may specify a configuration of a frame or group of frames. The frame structure component may indicate one or more of a time, frequency, pilot signature, code or other parameter of the frame or group of frames. More details of frame structure will be discussed hereinafter.

A multiple access scheme component may specify multiple access technique options, including technologies defining how communicating devices share a common physical channel, such as: TDMA; FDMA; CDMA; SDMA; SC-FDMA; Low Density Signature Multicarrier CDMA (LDS-MC-CDMA); Non-Orthogonal Multiple Access (NOMA); Pattern Division Multiple Access (PDMA); Lattice Partition Multiple Access (LPMA); Resource Spread Multiple Access (RSMA); and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources; and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all" concept. For example, it may be that the components within the air interface cannot be changed or adapted once the air interface is defined. In some implementations, only limited parameters or modes of an air interface, such as a cyclic prefix (CP) length or a MIMO mode, can be configured. In some embodiments, an air interface design may provide a unified or flexible framework to support frequencies below known 6 GHz bands and frequencies beyond the 6 GHz bands (e.g., mmWave bands) for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain and a frequency domain self-contained design may support more flexible RAN slicing through channel resource sharing between different services in both frequency and time.

A frame structure is a feature of the wireless communication physical layer that defines a time domain signal transmission structure to, e.g., allow for timing reference and timing alignment of basic time domain transmission units. Wireless communication between communicating devices may occur on time-frequency resources governed by a frame structure. The frame structure may, sometimes, instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g., uplink vs. downlink) occur in different frequency bands. TDD communication is when transmissions in different directions (e.g., uplink vs. downlink) occur over different time durations. FD communication is when transmission and reception occurs on the same time-frequency resource, i.e., a device can both transmit and receive on the same frequency resource contemporaneously.

One example of a frame structure is a frame structure, specified for use in the known LTE cellular systems, having the following specifications: each frame is 10 ms in duration; each frame has 10 subframes, which subframes are each 1 ms in duration; each subframe includes two slots, each of which slots is 0.5 ms in duration; each slot is for the transmission of seven OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD is specified as the integer time of OFDM symbol duration.

Another example of a frame structure is a frame structure, specified for use in the known new radio (NR) cellular systems, having the following specifications: multiple subcarrier spacings are supported, each subcarrier spacing corresponding to a respective numerology; the frame structure depends on the numerology but, in any case, the frame length is set at 10 ms and each frame consists of ten subframes, each subframe of 1 ms duration; a slot is defined as 14 OFDM symbols; and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing, the slot length is 1 ms and, for 30 kHz subcarrier spacing, the slot length is 0.5 ms. The NR frame structure may have more flexibility than the LTE frame structure.

Another example of a frame structure is, e.g., for use in a 6G network or a later network. In a flexible frame structure, a symbol block may be defined to have a duration that is the minimum duration of time that may be scheduled in the flexible frame structure. A symbol block may be a unit of transmission having an optional redundancy portion (e.g., CP portion) and an information (e.g., data) portion. An OFDM symbol is an example of a symbol block. A symbol block may alternatively be called a symbol. Embodiments of flexible frame structures include different parameters that may be configurable, e.g., frame length, subframe length, symbol block length, etc. A non-exhaustive list of possible configurable parameters, in some embodiments of a flexible frame structure, includes: frame length; subframe duration; slot configuration; subcarrier spacing (SCS); flexible transmission duration of basic transmission unit; and flexible switch gap.

The frame length need not be limited to 10 ms and the frame length may be configurable and change over time. In some embodiments, each frame includes one or multiple downlink synchronization channels and/or one or multiple downlink broadcast channels and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set to 5 ms for autonomous vehicle applications. As another example, smart meters on houses may not require fast initial access, in which case the frame length may be set as 20 ms for smart meter applications.

A subframe might or might not be defined in the flexible frame structure, depending upon the implementation. For example, a frame may be defined to include slots, but no subframes. In frames in which a subframe is defined, e.g., for time domain alignment, the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

A slot might or might not be defined in the flexible frame structure, depending upon the implementation. In frames in which a slot is defined, then the definition of a slot (e.g., in time duration and/or in number of symbol blocks) may be configurable. In one embodiment, the slot configuration is common to all UEs 110 or a group of UEs 110. For this case, the slot configuration information may be transmitted to the UEs 110 in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration may be transmitted independently from the frame configuration signaling and/or subframe configuration signaling. In general, the slot configuration may be system common, base station common, UE group common or UE specific.

The SCS may range from 15 KHz to 480 KHz. The SCS may vary with the frequency of the spectrum and/or maximum UE speed to minimize the impact of Doppler shift and phase noise. In some examples, there may be separate transmission and reception frames and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g., if more flexible symbol durations are implemented using inverse discrete Fourier transform (IDFT) instead of fast Fourier transform (FFT). Additional examples of frame structures can be used with different SCSs.

The basic transmission unit may be a symbol block (alternatively called a symbol), which, in general, includes a redundancy portion (referred to as the CP) and an information (e.g., data) portion. In some embodiments, the CP may be omitted from the symbol block. The CP length may be flexible and configurable. The CP length may be fixed within a frame or flexible within a frame and the CP length may possibly change from one frame to another, or from one group of frames to another group of frames, or from one subframe to another subframe, or from one slot to another slot, or dynamically from one scheduling to another scheduling. The information (e.g., data) portion may be flexible and configurable. Another possible parameter relating to a symbol block that may be defined is ratio of CP duration to information (e.g., data) duration. In some embodiments, the symbol block length may be adjusted according to: a channel condition (e.g., multi-path delay, Doppler); and/or a latency requirement; and/or an available time duration. As another example, a symbol block length may be adjusted to fit an available time duration in the frame.

A frame may include both a downlink portion, for downlink transmissions from a base station 170, and an uplink portion, for uplink transmissions from the UEs 110. A gap may be present between each uplink and downlink portion, which gap is referred to as a switching gap. The switching gap length (duration) may be configurable. A switching gap duration may be fixed within a frame or flexible within a frame and a switching gap duration may possibly change from one frame to another, or from one group of frames to another group of frames, or from one subframe to another subframe, or from one slot to another slot, or dynamically from one scheduling to another scheduling.

A device, such as a base station 170, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g., the center frequency, the lowest frequency or the highest frequency of the carrier. A carrier may be on a licensed spectrum or an unlicensed spectrum. Wireless communication with the device may also, or instead, occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and, optionally, one or multiple uplink resources. A cell may include one or multiple uplink resources and, optionally, one or multiple downlink resources. A cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may, instead or additionally, include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g., a carrier may have a bandwidth of 20 MHz and consist of one BWP or a carrier may have a bandwidth of 80 MHz and consist of two adjacent contiguous BWPs, etc. In other embodiments, a BWP may have one or more carriers, e.g., a BWP may have a bandwidth of 40 MHz and consist of two adjacent contiguous carriers, where each carrier has a bandwidth of 20 MHz. In some embodiments, a BWP may comprise non-contiguous spectrum resources, which consists of multiple non-contiguous multiple carriers, where the first carrier of the non-contiguous multiple carriers may be in the mmW band, the second carrier may be in a low band (such as the 2 GHz band), the third carrier (if it exists) may be in THz band and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage, $\beta/2$, of the total mean transmitted power, for example, the value of $\beta/2$ is taken as 0.5%.

The carrier, the BWP or the occupied bandwidth may be signaled by a network device (e.g., by a base station 170) dynamically, e.g., in physical layer control signaling such as the known downlink control channel (DCI), or semi-statically, e.g., in radio resource control (RRC) signaling or in signaling in the medium access control (MAC) layer, or be predefined based on the application scenario; or be determined by the UE 110 as a function of other parameters that are known by the UE 110, or may be fixed, e.g., by a standard.

User Equipment (UE) position information is often used in cellular communication networks to improve various performance metrics for the network. Such performance metrics may, for example, include capacity, agility and efficiency. The improvement may be achieved when elements of the network exploit the position, the behavior, the mobility pattern, etc., of the UE in the context of a priori information describing a wireless environment in which the UE is operating.

A sensing system may be used to help gather UE pose information, including UE location in a global coordinate system, UE velocity and direction of movement in the global coordinate system, orientation information and the information about the wireless environment. "Location" is also known as "position" and these two terms may be used interchangeably herein. Examples of well-known sensing systems include RADAR (Radio Detection and Ranging) and LIDAR (Light Detection and Ranging). While the sensing system can be separate from the communication system, it could be advantageous to gather the information using an integrated system, which reduces the hardware (and cost) in the system as well as the time, frequency or spatial resources needed to perform both functionalities. However, using the communication system hardware to perform sensing of UE pose and environment information is a highly challenging and open problem. The difficulty of the problem relates to factors such as the limited resolution of the communication system, the dynamicity of the environment, and the huge number of objects whose electromagnetic properties and position are to be estimated.

Accordingly, integrated sensing and communication (also known as integrated communication and sensing) is a desirable feature in existing and future communication systems.

Any or all of the EDs 110 and BS 170 may be sensing nodes in the system 100. Sensing nodes are network entities that perform sensing by transmitting and receiving sensing signals. Some sensing nodes are communication equipment that perform both communications and sensing. However, it is possible that some sensing nodes do not perform communications and are, instead, dedicated to sensing. The sensing agent 174 is an example of a sensing node that is dedicated to sensing. Unlike the EDs 110 and BS 170, the sensing agent 174 does not transmit or receive communication signals. However, the sensing agent 174 may communicate configuration information, sensing information, signaling information, or other information within the communication system 100. The sensing agent 174 may be in communication with the core network 130 to communicate information with the rest of the communication system 100. By way of example, the sensing agent 174 may determine the location of the ED 110*a*, and transmit this information to the base station 170*a* via the core network 130. Although only one sensing agent 174 is shown in FIG. 2, any number of sensing agents may be implemented in the communication system 100. In some embodiments, one or more sensing agents may be implemented at one or more of the RANS 120.

A sensing node may combine sensing-based techniques with reference signal-based techniques to enhance UE pose determination. This type of sensing node may also be known as a sensing management function (SMF). In some networks, the SMF may also be known as a location management function (LMF). The SMF may be implemented as a physically independent entity located at the core network 130 with connection to the multiple BSs 170. In other aspects of the present application, the SMF may be implemented as a logical entity co-located inside a BS 170 through logic carried out by the processor 260.

Figure 5:
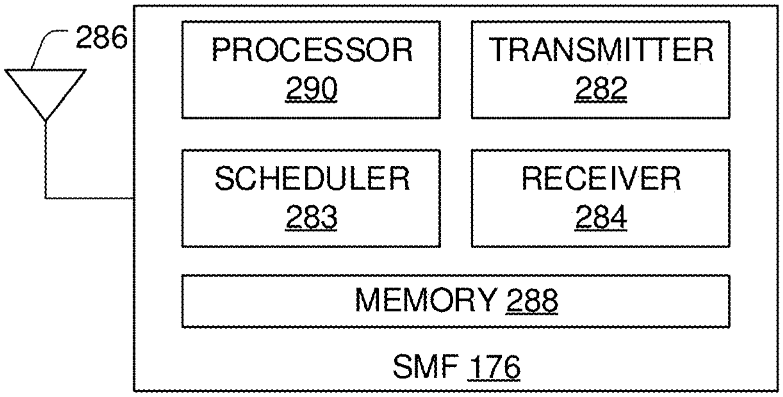
FIG. 5 illustrates, as a block diagram, a sensing management function, in accordance with aspects of the present application.

As shown in FIG. 5, an SMF 176, when implemented as a physically independent entity, includes at least one processor 290, at least one transmitter 282, at least one receiver 284, one or more antennas 286 and at least one memory 288. A transceiver, not shown, may be used instead of the transmitter 282 and the receiver 284. A scheduler 283 may be coupled to the processor 290. The scheduler 283 may be included within or operated separately from the SMF 176. The processor 290 implements various processing operations of the SMF 176, such as signal coding, data processing, power control, input/output processing or any other functionality. The processor 290 can also be configured to implement some or all of the functionality and/or embodiments described in more detail above. Each processor 290 includes any suitable processing or computing device configured to perform one or more operations. Each processor 290 could, for example, include a microprocessor, microcontroller, digital signal processor, field programmable gate array or application specific integrated circuit.

A reference signal-based pose determination technique belongs to an "active" pose estimation paradigm. In an active pose estimation paradigm, the enquirer of pose information (e.g., the UE 110) takes part in process of determining the pose of the enquirer. The enquirer may transmit or receive (or both) a signal specific to pose determination process. Positioning techniques based on a global navigation satellite system (GNSS) such as the known Global Positioning System (GPS), the Galileo Positioning System (Galileo), the GLONASS Positioning System and the Beidou Positioning System are other examples of the active pose estimation paradigm.

In contrast, a sensing technique, based on radar for example, may be considered as belonging to a "passive" pose determination paradigm. In a passive pose determination paradigm, the target is oblivious to the pose determination process.

By integrating sensing and communications in one system, the system need not operate according to only a single paradigm. Thus, the combination of sensing-based techniques and reference signal-based techniques can yield enhanced pose determination.

The enhanced pose determination may, for example, include obtaining UE channel sub-space information, which is particularly useful for UE channel reconstruction at the sensing node, especially for a beam-based operation and communication. The UE channel sub-space is a subset of the entire algebraic space, defined over the spatial domain, in which the entire channel from the TP to the UE lies. Accordingly, the UE channel sub-space defines the TP-to-UE channel with very high accuracy. The signals transmitted over other sub-spaces result in a negligible contribution to the UE channel. Knowledge of the UE channel sub-space helps to reduce the effort needed for channel measurement at the UE and channel reconstruction at the network-side. Therefore, the combination of sensing-based techniques and reference signal-based techniques may enable the UE channel reconstruction with much less overhead as compared to traditional methods. Sub-space information can also facilitate sub-space-based sensing to reduce sensing complexity and improve sensing accuracy.

In some embodiments of integrated sensing and communication, a same radio access technology (RAT) is used for sensing and communication. This avoids the need to multiplex two different RATs under one carrier spectrum, or necessitating two different carrier spectrums for the two different RATs.

[In embodiments that integrate sensing and communication under one RAT, a first set of channels may be used to transmit a sensing signal and a second set of channels may be used to transmit a communications signal. In some embodiments, each channel in the first set of channels and each channel in the second set of channels is a logical channel, a transport channel or a physical channel.

At the physical layer, communication and sensing may be performed via separate physical channels. For example, a first physical downlink shared channel PDSCH-C is defined for data communication, and a second physical downlink shared channel PDSCH-S is defined for sensing. Similarly, separate physical uplink shared channels (PUSCH), PUSCH-C and PUSCH-S, could be defined for uplink communication and sensing.

In another example, the same PDSCH and PUSCH could be also used for both communication and sensing, with separate logical layer channels and/or transport layer channels defined for communication and sensing. Note also that control channel(s) and data channel(s) for sensing can have the same or different channel structure (format), occupy same or different frequency bands or bandwidth parts.

In a further example, a common physical downlink control channel (PDCCH) and a common physical uplink control channel (PUCCH) may be used to carry control information for both sensing and communication. Alternatively, separate physical layer control channels may be used to carry separate control information for communication and sensing. For example, PUCCH-S and PUCCH-C could be used for uplink control for sensing and communication respectively and PDCCH-S and PDCCH-C for downlink control for sensing and communication respectively.

Different combinations of shared and dedicated channels for sensing and communication, at each of the physical, transport, and logical layers, are possible.

A terrestrial communication system may also be referred to as a land-based or ground-based communication system, although a terrestrial communication system can also, or instead, be implemented on or in water. The non-terrestrial communication system may bridge coverage gaps in underserved areas by extending the coverage of cellular networks through the use of non-terrestrial nodes, which will be key to establishing global, seamless coverage and providing mobile broadband services to unserved/underserved regions. It is currently difficult or impractical to implement terrestrial access-points/base-stations infrastructure in areas like oceans, mountains, forests, or other remote areas.

The terrestrial communication system may be a wireless communications system using 5G technology and/or later generation wireless technology (e.g., 6G or later). In some examples, the terrestrial communication system may also accommodate some legacy wireless technologies (e.g., 3G or 4G wireless technology). The non-terrestrial communication system may be a communications system using satellite constellations, like conventional Geo-Stationary Orbit (GEO) satellites, which utilize broadcast public/popular contents to a local server. The non-terrestrial communication system may be a communications system using low earth orbit (LEO) satellites, which are known to establish a better balance between large coverage area and propagation path-loss/delay. The non-terrestrial communication system may be a communications system using stabilized satellites in very low earth orbits (VLEO) technologies, thereby substantially reducing the costs for launching satellites to lower orbits. The non-terrestrial communication system may be a communications system using high altitude platforms (HAPs), which are known to provide a low path-loss air interface for UEs with limited power budget. The non-terrestrial communication system may be a communications system using Unmanned Aerial Vehicles (UAVs) (or unmanned aerial system, "UAS") achieving a dense deployment, because their coverage can be limited to a local area, such as airborne, balloon, quadcopter, drones, etc. In some examples, GEO satellites, LEO satellites, UAVs, HAPs and VLEOs may be horizontal and two-dimensional, meaning that coverage is defined by latitude and longitude but having no regard for altitude. In some examples, UAVs, HAPs and VLEOs may be coupled to integrate satellite communications to cellular networks. Emerging 3D vertical networks consist of many moving (other than geostationary satellites) and high altitude access points such as UAVs, HAPs and VLEOs.

MIMO technology allows an antenna array of multiple antennas to perform signal transmissions and receptions to meet high transmission rate requirements. The ED 110 and the T-TRP 170 and/or the NT-TRP may use MIMO to communicate using wireless resource blocks. MIMO utilizes multiple antennas at the transmitter to transmit wireless resource blocks over parallel wireless signals. It follows that multiple antennas may be utilized at the receiver. MIMO may beamform parallel wireless signals for reliable multipath transmission of a wireless resource block. MIMO may bond parallel wireless signals that transport different data to increase the data rate of the wireless resource block.

In recent years, a MIMO (large-scale MIMO) wireless communication system with the T-TRP 170 and/or the NT-TRP 172 configured with a large number of antennas has gained wide attention from academia and industry. In the large-scale MIMO system, the T-TRP 170, and/or the NT-TRP 172, is generally configured with more than ten antenna units (see antennas 256 and antennas 280 in FIG. 3). The T-TRP 170, and/or the NT-TRP 172, is generally operable to serve dozens (such as 40) of EDs 110. A large number of antenna units of the T-TRP 170 and the NT-TRP 172 can greatly increase the degree of spatial freedom of wireless communication, greatly improve the transmission rate, spectrum efficiency and power efficiency, and, to a large extent, reduce interference between cells. The increase of the number of antennas allows for each antenna unit to be made in a smaller size with a lower cost. Using the degree of spatial freedom provided by the large-scale antenna units, the T-TRP 170 and the NT-TRP 172 of each cell can communicate with many EDs 110 in the cell on the same time-frequency resource at the same time, thus greatly increasing the spectrum efficiency. A large number of antenna units of the T-TRP 170 and/or the NT-TRP 172 also enable each user to have better spatial directivity for uplink and downlink transmission, so that the transmitting power of the T-TRP 170 and/or the NT-TRP 172 and an ED 110 is reduced and the power efficiency is correspondingly increased. When the antenna number of the T-TRP 170 and/or the NT-TRP 172 is sufficiently large, random channels between each ED 110 and the T-TRP 170 and/or the NT-TRP 172 can approach orthogonality such that interference between cells and UEs and the effect of noise can be reduced. The plurality of advantages described hereinbefore enable large-scale MIMO to have a magnificent application prospect.

A MIMO system may include a receiver connected to a receive (Rx) antenna, a transmitter connected to transmit (Tx) antenna and a signal processor connected to the transmitter and the receiver. Each of the Rx antenna and the Tx antenna may include a plurality of antennas. For instance, the Rx antenna may have a uniform linear array (ULA) antenna, in which the plurality of antennas are arranged in line at even intervals. When a radio frequency (RF) signal is transmitted through the Tx antenna, the Rx antenna may receive a signal reflected and returned from a forward target.

A non-exhaustive list of possible unit or possible configurable parameters or in some embodiments of a MIMO system include: a panel; and a beam.

A panel is a unit of an antenna group, or antenna array, or antenna sub-array, which unit can control a Tx beam or an Rx beam independently.

A beam is a set of beamforming weights that are applied to signals such that these signals (which are electromagnetic waves) add constructively in a given direction. A Tx beam (respectively an Rx beam) may also be called a spatial transmit filter (respectively a spatial receive filter). A beam may be formed by performing amplitude and/or phase weighting on data transmitted or received by at least one antenna port. A beam may be formed by using another method, for example, adjusting a related parameter of an antenna unit. The beam may include a Tx beam and/or an Rx beam. The transmit beam indicates distribution of signal strength formed in different directions in space after a signal is transmitted through an antenna. The receive beam indicates distribution of signal strength that is of a wireless signal received from an antenna and that is in different directions in space. Beam information may include a beam identifier, or an antenna port(s) identifier, or a channel state information reference signal (CSI-RS) resource identifier, or a SSB resource identifier, or a sounding reference signal (SRS) resource identifier, or other reference signal resource identifier.

Frequency bands for 5G NR are known to be separated into two different frequency ranges: Frequency Range 1 (FR1); and Frequency Range 2 (FR2). FR1 includes sub-6 GHZ frequency bands, some of which are bands traditionally used by previous standards, but has been extended to cover potential new spectrum offerings from 410 MHz to 7125 MHz. FR2 includes frequency bands from 24.25 GHz to 52.6 GHz. Bands in this so-called "millimeter wave" range have shorter range but higher available bandwidth than bands in FR1.

Figure 6:
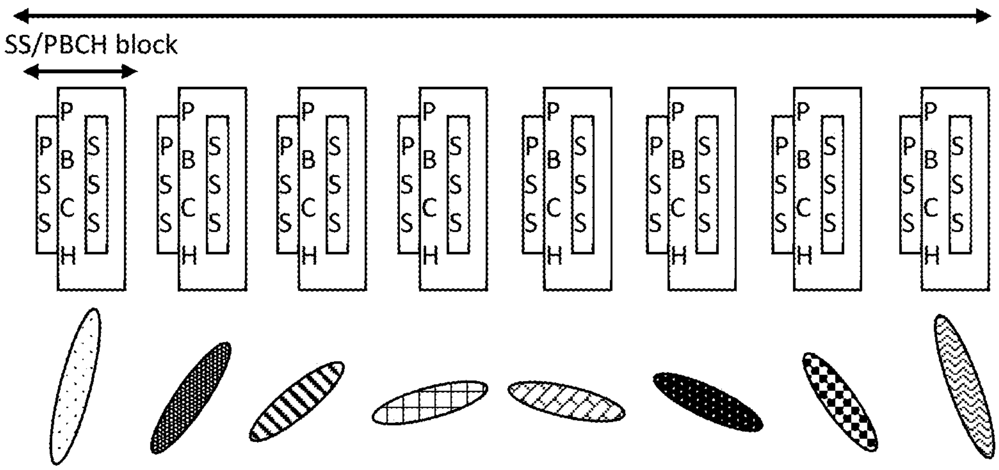
FIG. 6 (PRIOR ART)
FIG. 6 illustrates a known approach wherein a plurality of Synchronization Signal/Physical Broadcast Channel blocks are transmitted, each block in a given time location.

In 5G NR, synchronization signal ("SS") bursts are used to carry out a beam sweeping function for initial access. A SS burst may include up to 64 Synchronization Signal/Physical Broadcast Channel (SS/PBCH) blocks in frequency bands located in FR2. Each SS/PBCH block is transmitted in a given time location (called the SSB index) but the same signals/channel are repeated everywhere, as illustrated in FIG. 6. Equivalently, an SS/PBCH block is also called an "SSB" (Synchronization Signal Block), and both terms are used inter-changeably.

Legacy cellular procedures rely on the known cell search function. The cell search function allows a UE 110 to acquire time and frequency synchronization with a TRP 170. The cell search function also allows the UE 110 to detect a Physical Cell Identity (PCI) for the cell associated with the TRP 170. In 5G NR as well as 4G LTE, a primary synchronization signal (PSS) and a secondary synchronization signal (SSS) are used and are associated with a particular sequence design. The PSS/SSS sequence design explicitly assumes a three-sector deployment for the generation of sequences:

$$N_{ID}^{cell} = 3N_{ID}^{(1)} + N_{ID}^{(2)}.$$

The cell search function is designed in such a way that UEs 110 are led to search across all PCIs to find a suitable cell on which to camp. When a UE 110 camps on a cell, the UE 110 monitors System Information from the TRP 170 associated with the cell.

It is known that airborne platforms are able to provide coverage for much larger areas compared to cellular (terrestrial) TRPs 170. One example airborne platform is a balloon. Other example airborne platforms are known as High Altitude Platform Systems (HAPS).

It is known that 4G LTE was designed to operate in frequency bands in which omni-directional beams are practical. Indeed, practically speaking, a single beam in 4G LTE is equivalent to a single cell.

In 5G NR, the use of SS bursts is relied upon to carry out Beam Sweeping, as illustrated in FIG. 6. Each SSB index corresponds to a different time location as well as a distinct transmit beam filter being used by the TRP 170. Each distinct transmit beam filter is illustrated in FIG. 6 using a distinct shade of grey. This process of Beam Sweeping allows the UE 110 to try different receive beam filters while attempting to detect the SS/PBCH blocks from the TRP 170. It may be considered that, due to this time division multiplexing of beams, this known version of initial access is inherently time-consuming and spectrally wasteful.

Another problem has to do with the legacy of cellular procedures. Legacy cellular procedures rely on Cell Search, whose purpose it for the UE to acquire time and frequency synchronization as well as to detect the PCI of the cell. In 5G NR as well as 4G LTE, the PSS/SSS sequence design explicitly assumes a 3-sector deployment for the generation of sequences:

$$N_{ID}^{cell} = 3N_{ID}^{(1)} + N_{ID}^{(2)}.$$

The cell search function is designed in such a way that UEs 110 are led to search across all PCIs to find a suitable cell on which to camp.

Aspects of the present application relate to initial access procedures that allow a UE 110 to become connected to a non-terrestrial TRP 172, such as a HAPS device or a device carried by a balloon. Through reception of a positioning reference signal, a UE 110 may determine its own location coordinates. Then, using the location coordinates, the UE 110 may select a beam using a set of parameters associated, in a table, with the location coordinates. The UE 110 may then use the selected beam to carry out an initial access procedure with the NT-TRP 172.

Aspects of the present application relate to a positioning-assisted beam selection procedure. The UE 110 starts by scanning the frequency bands that are known to support mobile networks that employ NT-TRPs 172. That is, the UE 110 starts by scanning the frequency bands in which the UE 110 can expect to detect positioning reference signals from the NT-TRPs 172. These frequency bands may be sorted based on "ranks," thereby allowing the UE 110 to perform mobile network selection based on the ranking of the frequency band.

The UE 110 may then acquire a representation of its own location on the basis of the positioning reference signals. The UE 110 may also acquire the location of the NT-TRPs 172. Both of these location-determining actions may be carried out by decoding an associated positioning broadcast channel. The positioning broadcast channel may also include a positioning information block containing information such as, for example: a candidate value (C) for beam-group size; a candidate value ($M_1$) for beam-group index; an SSB pattern; and a Broadcast beam pattern. The SSB pattern may be expressed using values such as a time/frequency location within a frame structure, a SS burst size and an SS burst periodicity. The broadcast beam pattern may be expressed using values such as the SSB center frequency (i.e., the frequency in the center of the bandwidth occupied by the SSB), the SSB numerology (i.e., the subcarrier spacing used by the SSB) and beam pattern (i.e., the beam angular directions in which the SSBs are transmitted).

Initial access procedures that may be aided by aspects of the present application may be defined based on the Positioning-Assisted Beam Selection procedure. An NT-TRP 172 may transmit up to N beams towards a plurality of UEs 110 on the ground, where each beam is associated to a given sequence or to a given set of sequences. Different beams may be associated to the same given sequence. Each UE 110 may be provided with an ability to generate the sequences. Each UE 110 may also be provided with an ability to search for the sequences that the UE 110 has generated. In the absence of aspects of the present application, the UEs 110 may be burdened with performing a beam search among the N beams transmitted by the NT-TRP 172.

As discussed hereinbefore, the value C is representative of a beam-group size and the value $M_1$ is representative of a beam-group index. Notably, the beam-group index, $M_1$, may be expressed as an integer number in the range $\{0, \ldots, N_{Group}-1\}$. A value, $M_2$, is representative of a beam index. The beam index, $M_2$, may be expressed as an integer number in the range $\{0, \ldots, C-1\}$.

The beam-group index, $M_1$, and the beam index, $M_2$, may be used to generate sequences for reference signals, e.g., synchronization signals.

The NT-TRP 172 may use the positioning broadcast channel to indicate, to the UEs 110 on the ground, values for beam-group size, C, and beam-group index, $M_1$. The received values for beam-group size, C, and beam-group index, $M_1$, may be shown to allow the UE 110 to perform a beam selection procedure. More particularly, the beam selection procedure may be performed on the basis of the received value for the beam-group index, $M_1$. A beam that is selected using the beam selection procedure may then be used, by the UE 110, to acquire system information. That is, the UE 110 may receive, on the selected beam, a PDCCH carrying system information in a common Control Resource Set. Subsequent to receiving the system information, the UE 110 may initiate a random access function by transmitting, to the NT-TRP 172, a random access preamble. The UE 110 may also transmit, to the NT-TRP 172, feedback that includes an indication of the beam that was selected by the UE 110.

Throughout the present application, it is assumed that the NT-TRP 172 (e.g., a HAPS) continually transmits a plurality of beams towards the ground. Some of the transmitted beams may cover a relatively wide area and will, hereinafter, be referenced as "wide" beams. Some of the transmitted beams may cover a relatively small area and will, hereinafter, be referenced as "narrow" beams.

Figure 7:
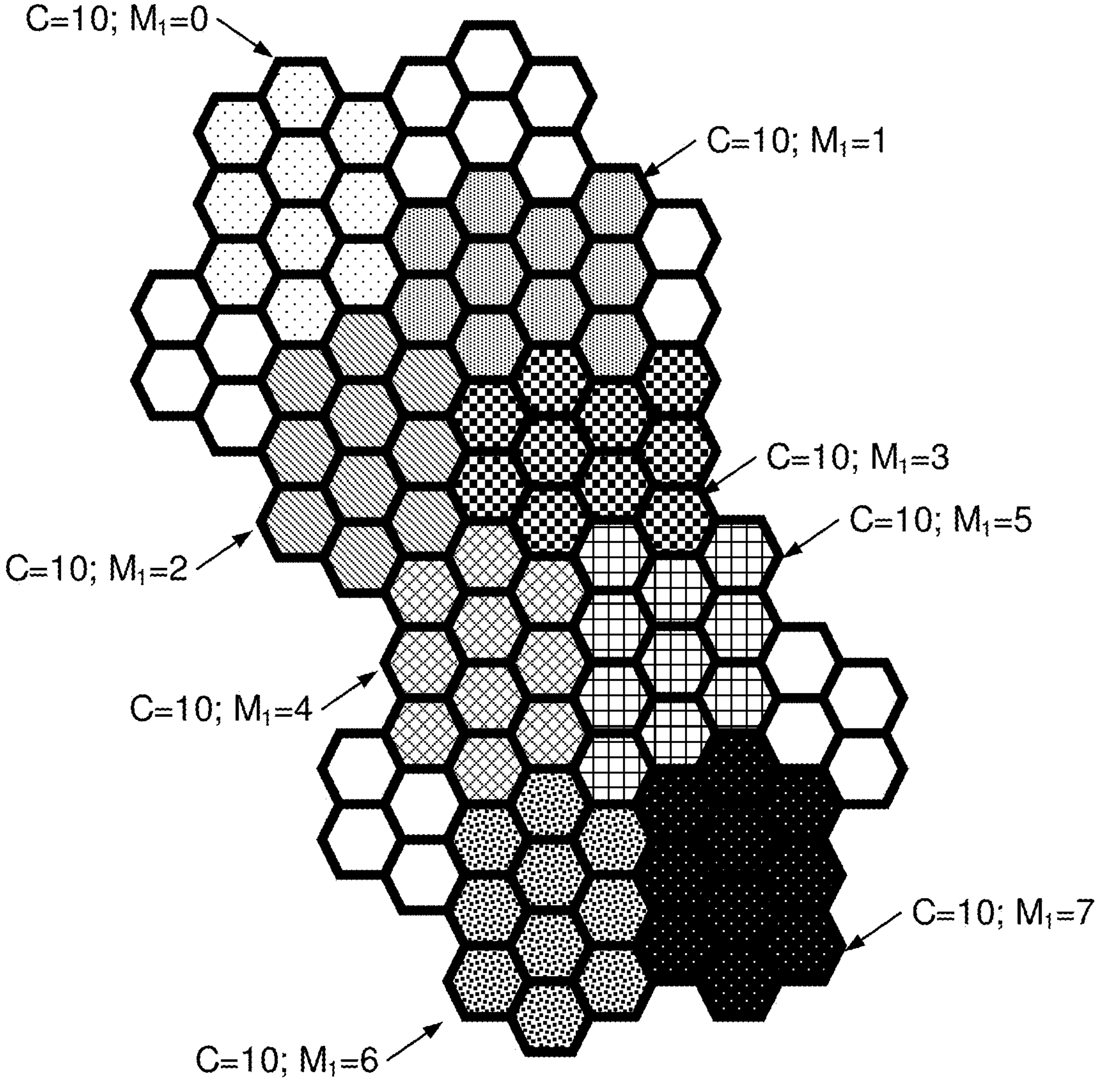
FIG. 7 a plurality of hexagonal cells are illustrated, with each hexagonal cell representative of a single beam transmitted by a non-terrestrial transmit receive point, the plurality of hexagonal cells are illustrated as belonging to one of eight beam-groups, in accordance with aspects of the present application.

In FIG. 7, 100 hexagonal cells are illustrated. 80 of the hexagonal cells are illustrated with one of eight distinct patterns. Each pattern is representative of one of eight distinct beam-groups transmitted by an NT-TRP 172. Each patterned hexagonal cell is representative of a single beam transmitted by the NT-TRP 172. In FIG. 7, each beam-group includes ten hexagonal cells, thereby representing that each beam-group includes ten beams. Within a given beam-group, the NT-TRP 172 transmits, using the positioning broadcast channel, the same system information on all ten beams.

In an aspect of the present application that may be referred to as "Flexible Beam Search," a positioning-assisted beam selection procedure is carried out. In a Flexible Beam Search, the NT-TRP 172 transmits an indication of a specific set, $\{C, M_1\}$, of values for beam-group size and beam-group index. The specific set, $\{C, M_1\}$, of values is associated with a certain range of latitude and longitude coordinates.

Figure 8:
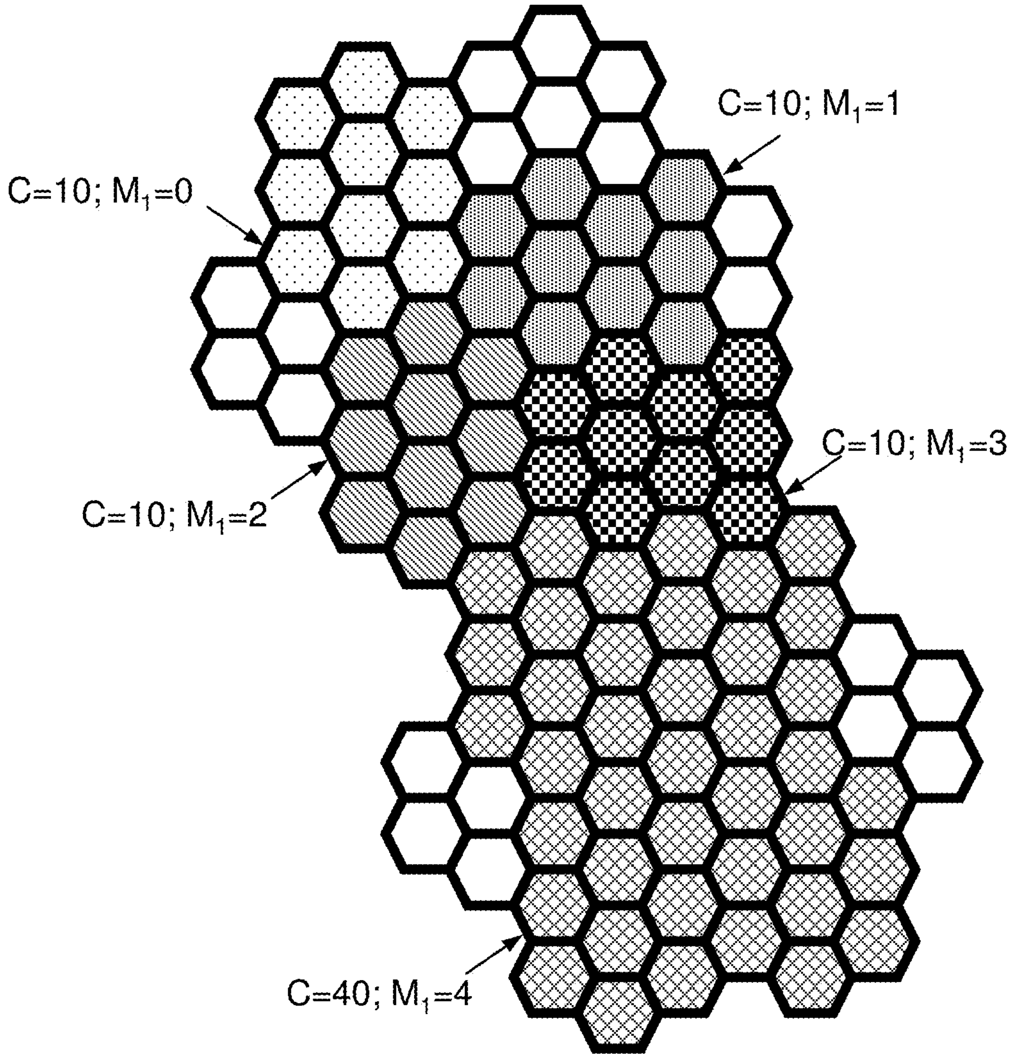
FIG. 8 a plurality of hexagonal cells are illustrated, with each hexagonal cell representative of a single beam transmitted by a non-terrestrial transmit receive point, the plurality of hexagonal cells are illustrated as belonging to one of five beam-groups, in accordance with aspects of the present application.

In FIG. 8, 100 hexagonal cells are illustrated. 80 of the hexagonal cells are illustrated with one of five distinct patterns. Each pattern is representative of one of eight distinct beam-groups transmitted by a given NT-TRP (not shown). Each patterned hexagonal cell is representative of a single beam transmitted by the NT-TRP. In FIG. 8, four of the beam-groups include ten hexagonal cells, thereby representing that each of these beam-groups include ten beams. In FIG. 8, one of the beam-groups includes 40 hexagonal cells, thereby representing that this one beam-group includes 40 beams. In FIG. 8, the sets, $\{C, M_1\}$, of values for beam-group size and beam-group index for the beam-groups include $\{10,0\}$, $\{10,1\}$, $\{10,2\}$, $\{10,3\}$ and $\{40,4\}$.

For a specific example, we may consider that a UE 110 is in a coverage area corresponding to the beam-group with the beam-group index, $M_1=2$ and the beam-group size, $C=10$.

Figure 9:
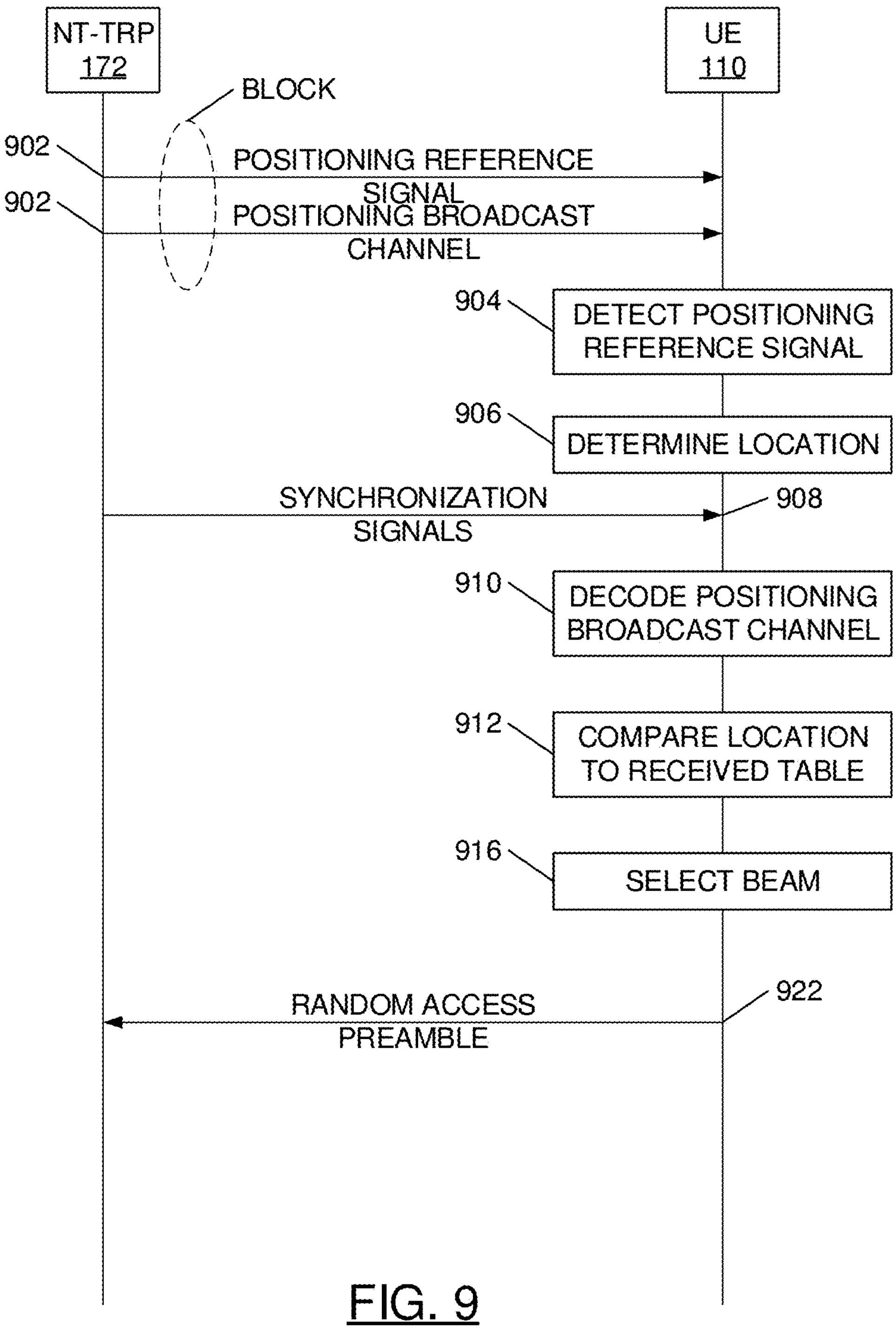
FIG. 9 illustrates, in a signal flow diagram, an initial access interaction between a non-terrestrial transmit receive point and a UE representative of a Flexible Beam Search, in accordance with aspects of the present application.

FIG. 9 illustrates, in a signal flow diagram, an initial access interaction between an NT-TRP 172 and a UE 110 representative of Flexible Beam Search aspects of the present application. Initially, the UE 110 selects a frequency band in which to seek reference signals and commences seeking reference signals in the selected frequency band. Seeking reference signals may involve the UE 110 detecting "positioning blocks." In a given positioning block, positioning reference signals and a positioning broadcast channel are transmitted (step 902) together.

The NT-TRP 172 transmits (step 902) a plurality of positioning blocks, where the NT-TRP 172 transmits a given positioning block towards a coverage area corresponding to a given beam-group.

[The UE 110 detects (step 904) a positioning reference signal in one of the positioning blocks transmitted by the NT-TRP 172.

On the basis of the positioning reference signal, the UE 110 may derive (step 906) its own location coordinates.

The UE 110 may then receive (step 908) synchronization signals transmitted by the NT-TRP 172. The received synchronization signals may include primary synchronization signals (PSS) and secondary synchronization signals (SSS).

The UE 110 may then decode (step 910) the positioning broadcast channel in the one of the positioning blocks transmitted by the NT-TRP 172 that included the detected positioning reference signal. The positioning broadcast channel includes a stream of bits that are encoded using channel coding techniques such as Convolutional Coding, Reed-Solomon Coding, Turbo-Coding, Low-Density Parity Check Coding, Polar Coding.

The decoding (step 910) of the positioning broadcast channel may involve the UE 110 decoding a positioning information block included in the positioning broadcast channel. The positioning information block may, for example, contain an indication of an association between location coordinate ranges and sets, $\{C, M_1\}$, of values for beam-group size and beam-group index. An example entry 1000 in a table mapping location coordinate ranges to values for sets, {C, $M_1$}, is illustrated in FIG. 10.

Figure 11:
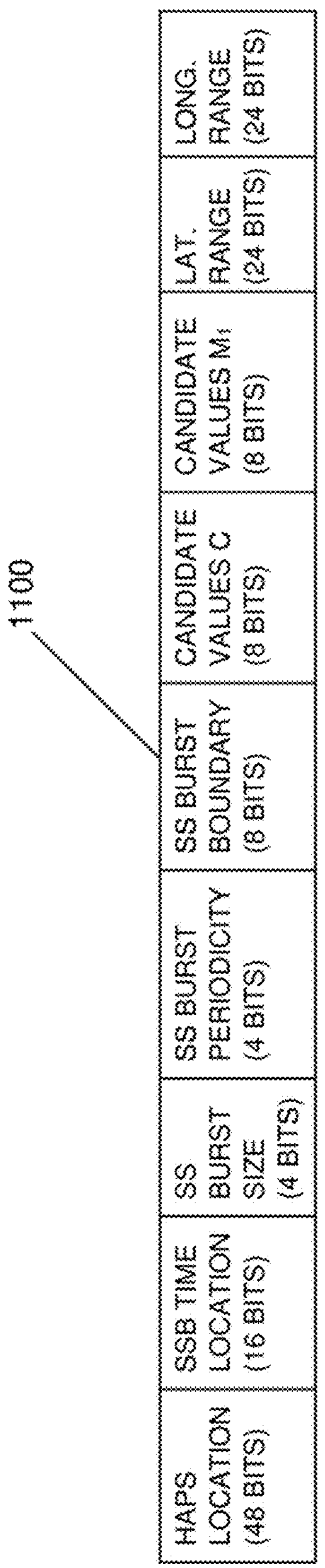
FIG. 11 illustrates an example positioning information block transmitted by a non-terrestrial transmit receive point, in accordance with aspects of the present application.

For distinct beam-groups, the content of the positioning information block is also distinct. Indeed, the content of the positioning information block transmitted (step 902) for a given beam-group relates to the location coordinates of the area being covered by the given beam-group. An example positioning information block 1100 is illustrated in FIG. 11. Notably, the example positioning information block 1100 includes an indication of a latitude range and a longitude range to associate with a particular beam-group size, C, and beam-group index, $M_1$.

According to aspects of the present application, the positioning information block (not shown) does not include an indication of a latitude range or a longitude range. Such range-free positioning information blocks are transmitted in different beam-groups, and an assumption that the UE would detect only the positioning information block with the strongest received power is relied upon.

The UE 110 may compare (step 912) the location determined (step 906) from the positioning reference signal against the location coordinate range indicated in the positioning broadcast channel. By way of this comparison, the UE 110 may obtain values for beam-group size, C, and beam-group index, $M_1$.

A given beam may be associated on a one-to-one basis with a sequence of an SSS so that, when the UE 110 detects an SSS, the UE 110 consequently selects (step 916) the beam associated with the detected SSS. It is expected that the UE 110 will use algorithms and functions to implement receive beams as part of a beam-based communication scheme.

Notably, different beams are associated with the synchronization signals; PSS and SSS. As discussed hereinbefore, a set of beams may be considered as a set of spatial filtering coefficients. The spatial filtering coefficients allow devices to carry out signal processing in the spatial domain. Synchronization signals carry binary sequences whose modulated bits may be mapped onto given time-frequency resources. In aspects of the present application, the same PSS is transmitted, by the NT-TRP 172, on all beams within a given beam-group. However, a given SSS is only transmitted on a unique, associated beam within a beam-group. The selection (step 916) of a particular beam within a particular beam-group occurs responsive to the UE 110 detecting a particular SSS. The UE 110 accomplishes the detecting by looking for a binary sequence that is uniquely carried by the SSS using spatial receive beams. The UE 110 can derive the binary sequence because the derivation formula is known to the UE 110. Each one of C binary sequences may be generated, by the UE 110, using the beam-group index, $M_1$, which the UE 110 has determined, and the beam index, $M_2$, which the UE 110 has not determined. However, the UE 110 may generate C unique binary sequences by trying each possible beam index, $M_2$, in the range {0, . . . , C−1}.

The UE 110, upon selecting (step 916) a beam within the beam-group associated with the beam-group index, $M_1$, transmits (step 922) a random access preamble on the selected beam, thereby initiating the random access function. Recall that the random access function is the fourth of the set of four physical layer functions referred to with the term "initial access."

Another aspect of the present application, which aspect may be referred to as "Static Beam Search," includes a positioning-assisted beam selection procedure. It is known that, in general, the UE 110 will be associated with a subscriber identity module or subscriber identification module card, better known as a "SIM card." The function of the SIM card may be carried out by a physical integrated circuit or in software. According to the Static Beam Search aspect of the present application, the UE 110 has access to a SIM card that is pre-loaded with indications of specific sets, {C, $M_1$}, of values for beam-group size and beam-group index. The specific sets, {C, $M_1$}, of values are each associated with a certain range of latitude and longitude coordinates. FIG. 12 illustrates a table 1200 that includes a mapping of latitude and longitude ranges to parameter values for {C, $M_1$}.

Figure 13:
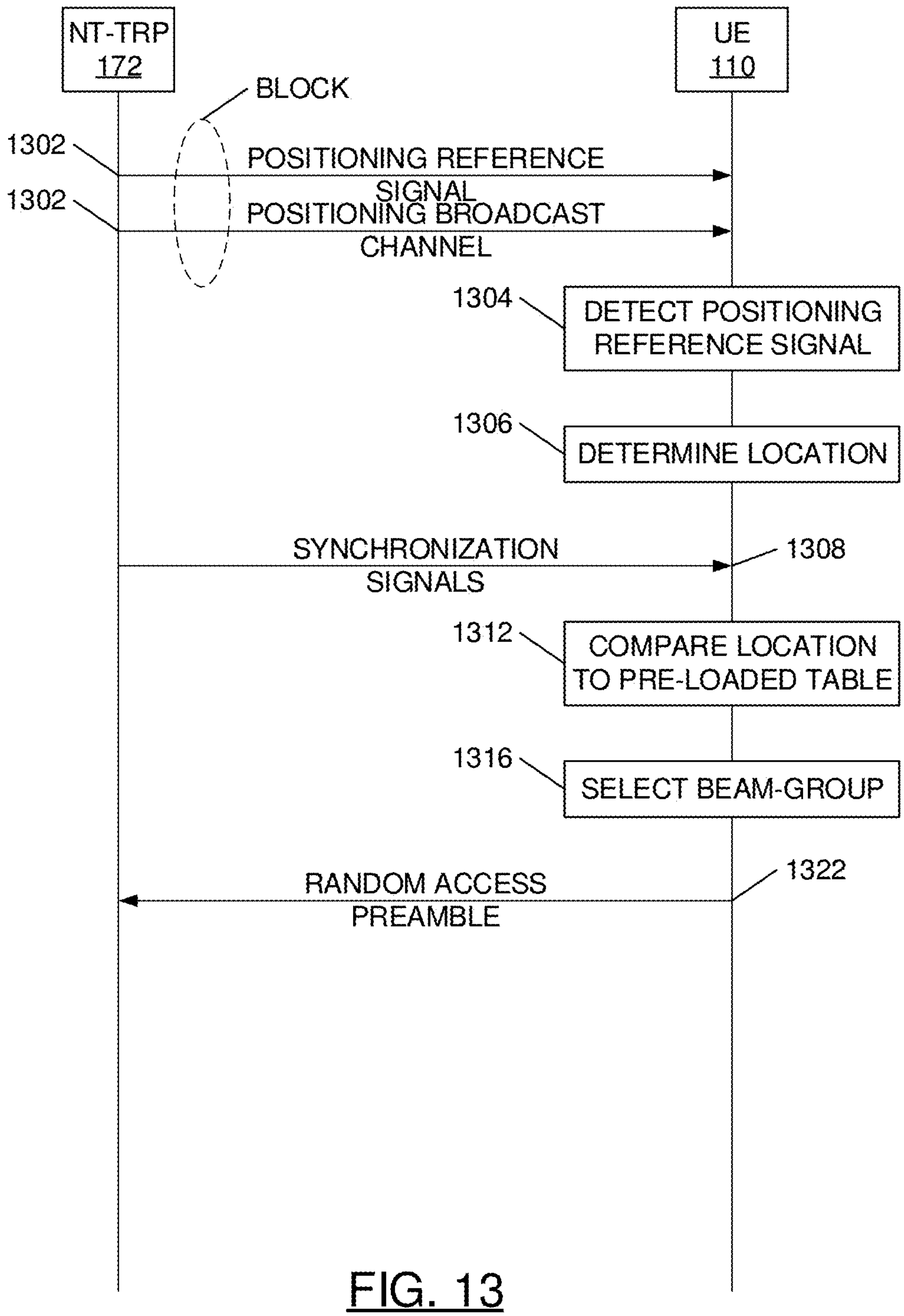
FIG. 13 illustrates, in a signal flow diagram, an initial access interaction between a non-terrestrial transmit receive point and a UE representative of a Static Beam Search, in accordance with aspects of the present application.

FIG. 13 illustrates, in a signal flow diagram, an initial access interaction between an NT-TRP 172 and a UE 110 representative of Static Beam Search aspects of the present application. Initially, the UE 110 selects a frequency band in which to seek reference signals.

The NT-TRP 172 transmits (step 1302) a plurality of positioning blocks.

The UE 110 detects (step 1304) a positioning reference signal in one of the positioning blocks transmitted by the NT-TRP 172.

On the basis of the positioning reference signal, the UE 110 may derive (step 1306) its own location coordinates.

The UE 110 may then receive (step 1308) synchronization signals transmitted by the NT-TRP 172. The received synchronization signals may include PSS and SSS.

[Recall, from FIG. 9, that the Flexible Beam Search aspect of the present application involves obtaining, by decoding a positioning information block transmitted in a positioning broadcast channel, a table that maps location coordinates to a set of values for sets, {C, $M_1$}, of values for beam-group size and beam-group index. In contrast, the Static Beam Search aspect of the present application involves consulting a pre-loaded table. The pre-loaded table may, for example, be included on a SIM card.

The UE 110 then compares (step 1312) the location determined (step 1306) from the positioning reference signal against the positioning ranges indicated in the pre-loaded table.

Upon determining (step 1312) that the specific latitude and longitude, determined (step 1306) from the positioning reference signal, fits within latitude and longitude ranges in a given one of the rows in the table, the UE 110 may use the parameter values for {C, $M_1$} in the given one of the rows to select a beam-group.

The UE 110, upon selecting (step 1316) a beam within the beam-group associated with the beam-group index, $M_1$, transmits (step 1322) a random access preamble on the selected beam, thereby initiating the random access function. Recall that the random access function is the fourth of the set of four physical layer functions referred to with the term "initial access."

Another aspect of the present application, which aspect may be referred to as "Frequency Band Based Beam Search," includes a positioning-assisted beam selection procedure.

According to the Frequency Band Based Beam Search aspect of the present application, it is assumed that the UE 110 supports different frequency bands. Each frequency band that supports HAPS operation is associated with a set of parameter values, {C, $N_{Group}$}. As an example, a frequency band "b1" may be selected by the UE 110. The parameter values for frequency band "b1" may be C=10 and $N_{Group}$=8. The parameter values indicate that NT-TRPs 172 transmitting on frequency band "b1" are transmitting eight beam-groups with ten beams per beam-group, as illustrated in FIG. 7. Other frequency bands may be associated with other parameter values for the set {C, $N_{Group}$}.

Figure 14:
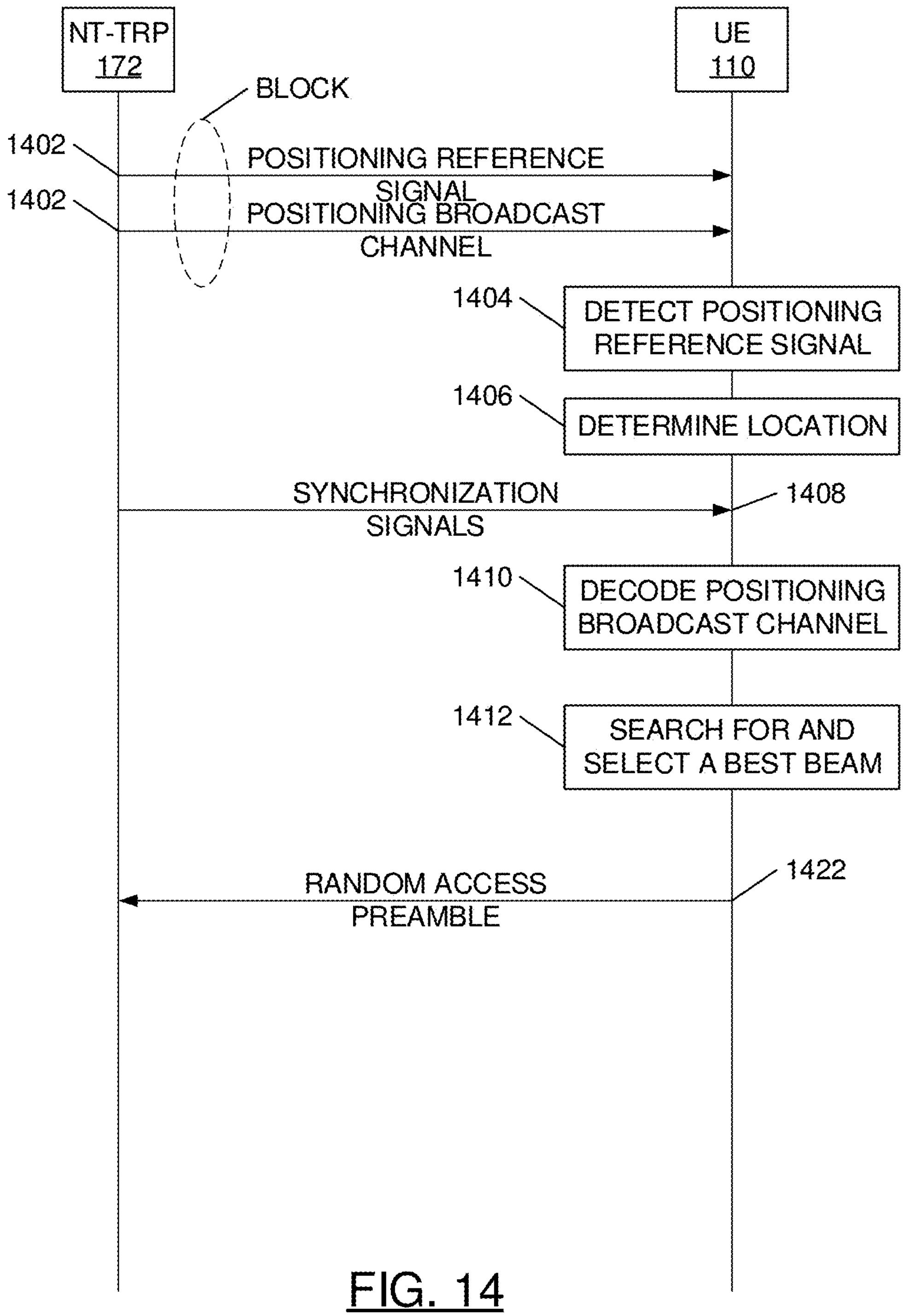
FIG. 14 illustrates, in a signal flow diagram, an initial access interaction between a non-terrestrial transmit receive point and a UE representative of a Frequency Band Based Beam Search, in accordance with aspects of the present application.

FIG. 14 illustrates, in a signal flow diagram, an initial access interaction between an NT-TRP 172 and a UE 110 representative of Frequency Band Based Beam Search aspects of the present application. Initially, the UE 110 selects a frequency band in which to seek reference signals. Seeking reference signals may involve the UE 110 detecting positioning blocks. As stated hereinbefore, in a given positioning block, positioning reference signals and a positioning broadcast channel are transmitted together.

The NT-TRP 172 transmits (step 1402) a plurality of positioning blocks.

The UE 110 detects (step 1404) a positioning reference signal in one of the positioning blocks transmitted by the NT-TRP 172.

On the basis of the positioning reference signal, the UE 110 may derive (step 1406) its own location coordinates.

The UE 110 may then receive (step 1408) synchronization signals transmitted by the NT-TRP 172. The received synchronization signals may include PSS and SSS.

The UE 110 may then decode (step 1410) the positioning broadcast channel in the one of the positioning blocks transmitted by the NT-TRP 172 that included the detected positioning reference signal. The positioning broadcast channel includes a stream of bits that are encoded using channel coding techniques such as Convolutional Coding, Reed-Solomon Coding, Turbo-Coding, Low-Density Parity Check Coding, Polar Coding.

The decoding (step 1410) of the positioning broadcast channel may involve the UE 110 decoding a positioning information block included in the positioning broadcast channel. The positioning information block may, for example, contain a table that maps location coordinates to a set of values for $M_1$. An example table 1500 mapping location coordinates to a plurality of values for the beam-group index, $M_1$, is illustrated in FIG. 15.

Upon determining a set of values for $M_1$, the UE 110 may select a "best" beam-group among the beam-groups associated with the plurality of candidate values for the beam-group index, $M_1$. The UE 110 may then blindly search for and select (step 1412) a beam among the beams transmitted in the selected beam-group.

The UE 110, upon selecting (step 1412) a beam, transmits (step 1422) a random access preamble on the selected beam, thereby initiating the random access function. Recall that the random access function is the fourth of the set of four physical layer functions referred to with the term "initial access."

Another aspect of the present application, which aspect may be referred to as "Cellular-Assisted Beam Search", includes a positioning-assisted beam selection procedure.

According to the Cellular-Assisted Beam Search aspect of the present application, it is assumed that the UE 110 has an existing connection with a T-TRP, and, by extension, a cellular system. It is further assumed that the T-TRP provides the UE 110 with a table of candidate values for {C, $M_1$} corresponding to different latitude and longitude ranges. An example table 1600 is illustrated in FIG. 16. The table 1600 illustrated in FIG. 16 may be associated with a given frequency band in which NT-TRPs 172 are expected to be transmitting.

Figure 17:
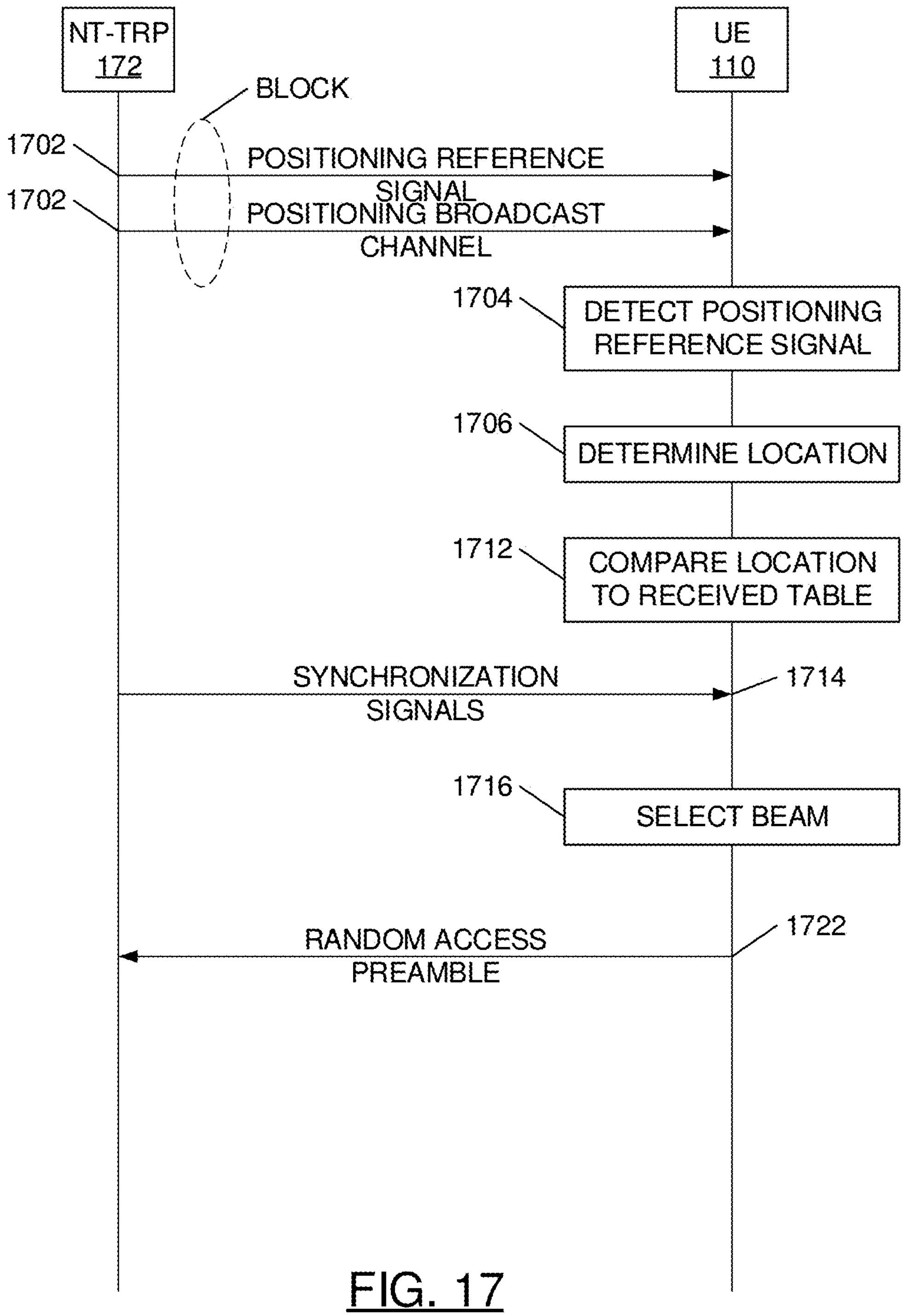
FIG. 17 illustrates, in a signal flow diagram, an initial access interaction between a non-terrestrial transmit receive point and a UE representative of a Cellular-Assisted Beam Search, in accordance with aspects of the present application.

FIG. 17 illustrates, in a signal flow diagram, an initial access interaction between an NT-TRP 172 and a UE 110 representative of Cellular-Assisted Beam Search aspects of the present application. Initially, the UE 110 selects a frequency band in which to seek reference signals. Seeking reference signals may involve the UE 110 detecting positioning blocks. As stated hereinbefore, in a given positioning block, positioning reference signals and a positioning broadcast channel are transmitted together.

The NT-TRP 172 transmits (step 1702) a plurality of positioning blocks.

The UE 110 detects (step 1704) a positioning reference signal in one of the positioning blocks transmitted by the NT-TRP 172.

On the basis of the positioning reference signal, the UE 110 may derive (step 1706) its own location coordinates.

The UE 110 then compares (step 1712) the location determined (step 1706) from the positioning reference signal against the latitude and longitude ranges indicated in the table received from the T-TRP.

Upon determining (step 1712) that the specific latitude and longitude, determined (step 1706) from the positioning reference signal, fits within latitude and longitude ranges in a given one of the rows in the table, the UE 110 may use the parameter values for {C, $M_1$} in the given one of the rows to select a beam-group.

The UE 110 may then receive (step 1714) synchronization signals transmitted by the NT-TRP 172. The received synchronization signals may include PSS and SSS.

The UE 110, upon selecting (step 1716) a beam within the beam-group associated with the beam-group index, $M_1$, transmits (step 1722) a random access preamble on the selected beam, thereby initiating the random access function. Recall that the random access function is the fourth of the set of four physical layer functions referred to with the term "initial access."

As discussed hereinbefore in the context of the signal flow diagrams of FIGS. 9, 13, 14 and 17, one step that precedes a UE 110 connecting to a communication system (via, say, an NT-TRP) is a step of selecting a frequency band. A UE 110 typically scans a selected frequency band in an effort to detect a radio frequency (RF) channel based on the RF capabilities of the UE 110. Notably, there is no pre-defined rule regarding an order in which frequency bands are selected for scanning by the UE 110.

According to aspects of the present application, each frequency band among a set of frequency bands may be assigned a rank, represented, for example, as an integer value. The assignment of a rank to each frequency band may be carried out, in one aspect of the present application, at the known Non-Access Stratum. The Non-Access stratum (NAS) is a functional layer in the Universal Mobile Telecommunications Service and the LTE wireless telecommunication protocol stacks between the core network 130 and the UE 110. This layer is used to manage the establishment of communication sessions and for maintaining continuous communications with UE 110 as the UE 110 moves.

In addition to the assignment of a rank to each frequency band, the NAS (or another entity) may also control the manner in which the UE 110 selects frequency bands for scanning for RF channels. In one example, the UE 110 may select frequency bands for scanning for RF channels in increasing order of rank. In another example, the UE 110 may select frequency bands for scanning for RF channels in decreasing order of rank.

The NAS (or another entity) may also assign, to each frequency band, a "type" or "category." Such an assignment is intended to distinguish, for example, between a terrestrial usage and a non-terrestrial usage. Further priority rules may be developed to establish an order for selecting frequency bands for scanning and for scanning RF channels within a selected frequency band.

As discussed hereinbefore, positioning reference signals may be generated at a UE 110 based on a sequence that the UE 110 may generate without indication from an NT-TRP 172. The time-frequency resources occupied by the positioning reference signals are known in advance to the UE 110, in relation to an under-lying radio frame structure. An example structure of a radio frame 1800 is illustrated in FIG. 18.

Figure 18:
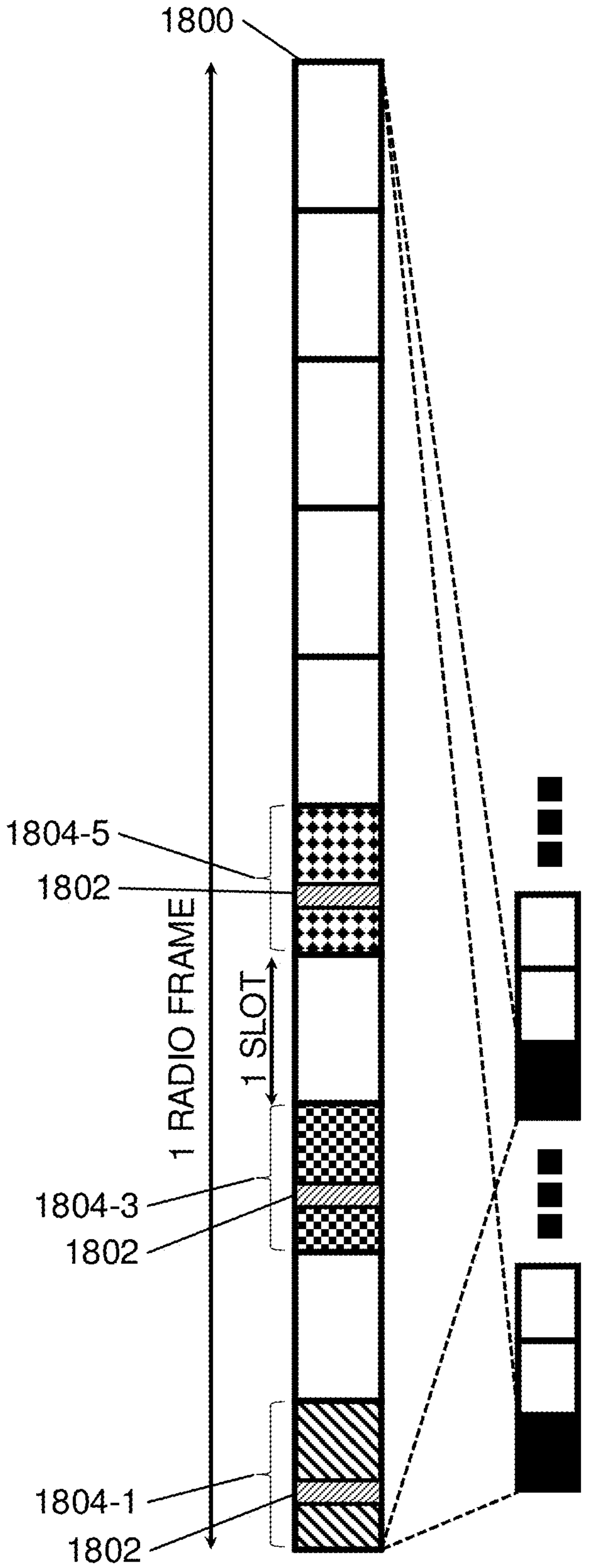
FIG. 18 illustrates example structure of a radio frame, in accordance with aspects of the present application.

In the example structure of FIG. 18, the radio frame 1800 spans ten slots. Each slot may, for example, be understood to contain 14 OFDM symbols. In the example structure of FIG. 18, positioning reference signals are transmitted in the 6th OFDM symbol of a given slot, which symbol is illustrated in association with reference numeral 1802. Three slots are reserved for transmitting positioning reference signals. The three slots reserved for transmitting positioning reference signals are illustrated in association with reference numerals 1804-1, 1804-3, 1804-5.

Any given NT-TRP 172 may transmit in one of the three slots (1804-1, 1804-3, 1804-5) reserved for transmission of positioning reference signals. The radio frames in which positioning reference signals are transmitted are assumed to have a periodicity. According to one example periodicity, a radio frame in which positioning reference signals are transmitted may be transmitted once every 100 radio frames.

In an example ranking, consider a UE 110 that supports four frequency bands, which frequency bands may be referenced as B1, B2, B3 and B4. As discussed hereinbefore, a different rank may be assigned to each of these frequency bands. The UE 110 may discover the rank assigned to the four frequency bands in a record stored at the UE 110. For one example, the ranking record may be stored in a SIM card. For another example, the ranking record may be stored after having been received from a NAS. A first example ranking record may indicate: B1 rank=3; B2 rank=2; B3 rank=1; and B4 rank=4.

On the basis of the first example ranking record, the UE 902 may select frequency bands, one at a time, based on increasing order of rank, i.e., a frequency band with a lower-valued integer rank is selected for scanning for RF channels before a frequency band with a lower-valued integer rank is selected for scanning for RF channels. The UE 110 may initially select frequency band B3, then select frequency band B2, then select frequency band B1 and, lastly, select frequency band B4.

A second example ranking record may include indications of categories, such as a terrestrial category and a non-terrestrial category. Assuming, again, that the UE 110 supports four frequency bands, the second example ranking record may indicate: B1 category=non-terrestrial, rank=1; B2 category=terrestrial, rank=1; B3 category=terrestrial, rank=2; and B4 category=non-terrestrial, rank=2.

The UE 110 may be configured to select a frequency band for scanning for RF channels on the basis of category first, followed by increasing order of rank, with the non-terrestrial category taking precedent over the terrestrial category. Accordingly, the UE 110 may initially select frequency band B1, then select frequency band B4, then select frequency band B2 and, finally, select frequency band B3.

Figure 19:
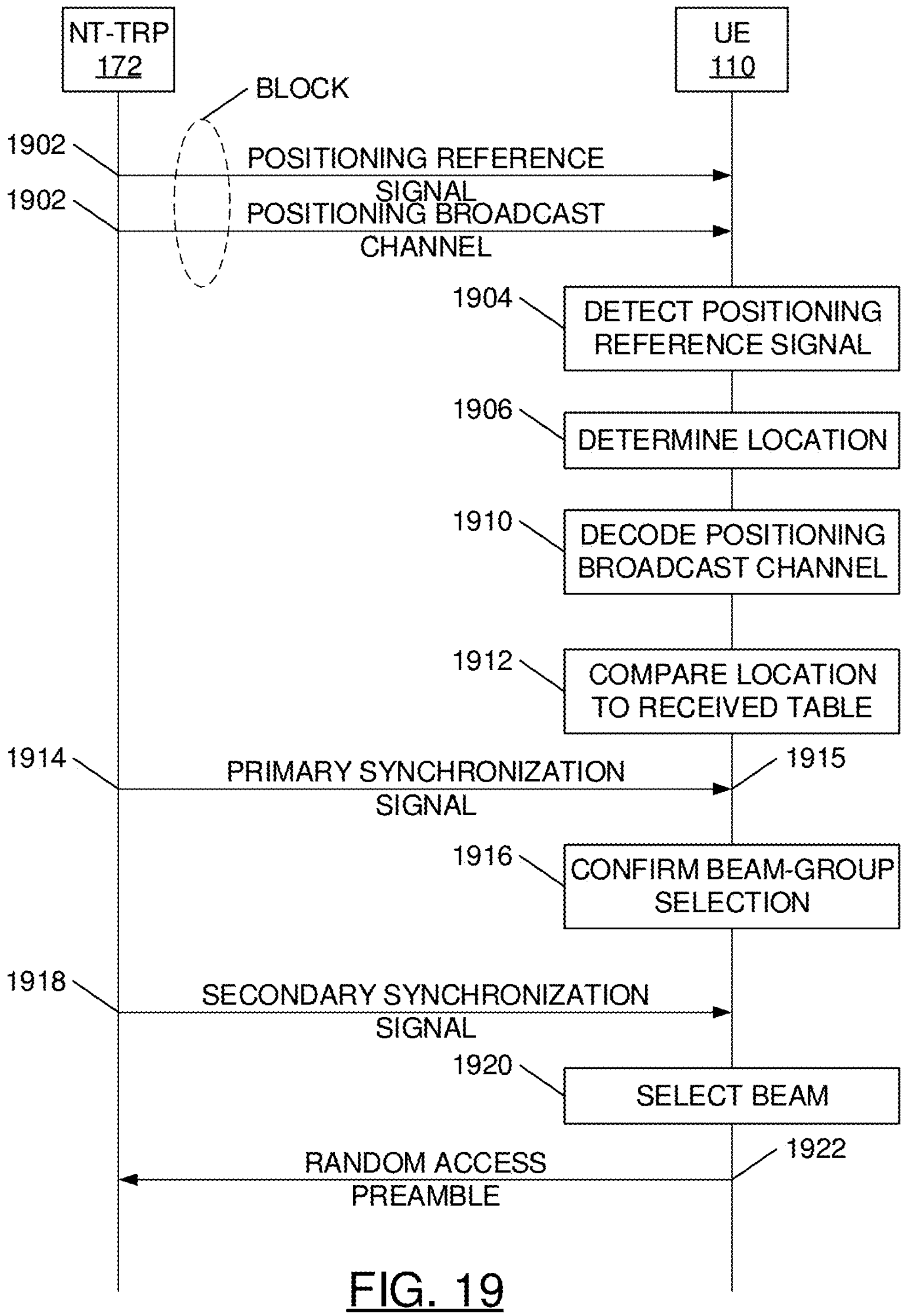
FIG. 19 illustrates, in a signal flow diagram, an initial access interaction between a non-terrestrial transmit receive point and a UE representative of a HAPS-Assisted Beam Search, in accordance with aspects of the present application.

FIG. 19 illustrates, in a signal flow diagram, an initial access interaction between an NT-TRP 172 and a UE 110 representative of HAPS-Assisted Beam Search aspects of the present application.

Initially, the UE 110 selects a frequency band in which to seek reference signals. Seeking reference signals may involve the UE 110 detecting positioning blocks. As stated hereinbefore, in a given positioning block, positioning reference signals and a positioning broadcast channel are transmitted together.

The NT-TRP 172 transmits (step 1902) a plurality of positioning blocks.

The UE 110 detects (step 1904) a positioning reference signal in one of the positioning blocks transmitted by the NT-TRP 172.

On the basis of the positioning reference signal, the UE 110 may derive (step 1906) its own location coordinates.

The UE 110 may then decode (step 1910) the positioning broadcast channel in the one of the positioning blocks transmitted by the NT-TRP 172 that included the detected positioning reference signal.

The decoding (step 1910) of the positioning broadcast channel may involve the UE 110 decoding a positioning information block included in the positioning broadcast channel. The positioning information block may, for example, contain a table that maps location coordinate ranges to a set of values for sets, $\{C, M_1\}$, of values for beam-group size and beam-group index. An example entry 1000 in a table mapping location coordinate ranges to values for sets, $\{C, M_1\}$, is illustrated in FIG. 10.

The UE 110 then compares (step 1912) the location determined (step 1906) from the positioning reference signal against the latitude and longitude ranges indicated in the table received, from the NT-TRP 172, in the positioning broadcast channel.

Upon determining (in step 1912) that the specific latitude and longitude, determined (step 1906) from the positioning reference signal, fits within latitude and longitude ranges in a given one of the rows in the table, it may be understood that the UE 110 selects a beam-group associated with the value for parameter $M_1$. The UE 110 may then use the determined parameter value for $M_1$ to generate a first synchronization sequence. The first sequence may, for one example, be based on so-called m-sequences. The first sequence may, for another example, be based on Zadoff-Chu sequences. The first sequence may, for another example, be based on Gold sequences. The first sequence may, for another example, be based on Hadamard sequences. The first sequence may, for a general example, be based on other sequences with good auto-correlation properties. An example sequence, $d_{PSS}(m)$, may be determined using the expression $d_{PSS}(m)=1-2\cdot x(m, M_1)$, where $x(\cdot)$ is an m-sequence of a given length and may be expressed as an irreducible polynomial. One example of the Primary Synchronization Sequence of length N can be generated as follows:

$$d_{PSS}(n) = 1 - 2 \cdot x(m),\ m = \left(n + \frac{a}{c}M_1\right)$$

mod N where n, m, a, c and N are all positive integer values and mod is the modulo operation.

Notably, the positioning information block 1100 of FIG. 11 includes an indication of the location of the NT-TRP 172. Upon decoding (step 1910) the positioning broadcast channel and, thereby, obtaining the positioning information block, the UE 110 may select a receive-beam direction to optimize receipt of signals from the NT-TRP 172. The UE 110 may, in particular, use the location of the NT-TRP 172 found in the positioning information block when selecting a receive-beam direction.

The NT-TRP 172 transmits (step 1914) a primary synchronization signal. Upon detecting (step 1915) the primary synchronization signal, the UE 110 may confirm (step 1916) the selected beam-group. The UE 110 confirms (step 1916) the selected beam-group by matching the sequence received in the primary synchronization signal to the sequence generated, by the UE 110, on the basis of the determined parameter value for $M_1$.

The sequences for the primary synchronization signals may be generated, by the NT-TRP 172, also using the value for the parameter $M_1$ as an input.

The NT-TRP 172 transmits (step 1918) a secondary synchronization signal. The sequences for the secondary synchronization signals may be generated, by the NT-TRP 172, using $M_1$ and $M_2$ as input. The sequences may, for one example, be based on so-called m-sequences. The sequences may, for another example, be based on Zadoff-Chu sequences. The sequences may, for another example, be based on Gold sequences. The sequences may, for another example, be based on Hadamard sequences. The sequences may, for a general example, be based on other sequences with good auto-correlation properties. An example sequence, $d_{SSS}(m)$, may be determined, by the NT-TRP 172, using the expression $d_{SSS}(m)=1-2\cdot x(m, M_1, M_2)$, where $x(\cdot)$ is an m-sequence of a given length and may be expressed as an irreducible polynomial. One example of the Secondary Synchronization Sequence of length N can be generated as follows:

$$d_{SSS}(n) = 1 - 2 \cdot x(m),\ m = \left(n + \frac{a}{c}M_1 + \frac{b}{d}M_2\right)$$

mod N where n, m, a, b, c, d and N are all positive integer values and mod is the modulo operation. Another example of the Secondary Synchronization Sequence of length N can be generated as follows:

$$d_{SSS}(n) = (1 - 2 \cdot x(m_1)) \cdot (1 - 2 \cdot x(m_2)),$$
$$m_1 = \left(n + \frac{a}{c}M_1\right)\text{mod}N,$$
$$m_2 = \left(n + \frac{b}{d}M_2\right)\text{mod}N,$$

where $m_1$, $m_2$, n, a, b, c, d and N are all positive integer values and mod is the modulo operation. Another example of the Secondary Synchronization Sequence of length N can be generated as follows:

$$d_{SSS}(n) = (1 - 2 \cdot x(m_1)) \cdot (1 - 2 \cdot x(m_2)),$$
$$m_1 = \left(n + \frac{a}{c}M_1\right)\text{mod}N_1,$$
$$m_2 = \left(n + \frac{b}{d}M_2\right)\text{mod}N,\ N_1 \le N,$$

where $m_1$, $m_2$, n, a, b, c, d, $N_1$ and N are all positive integer values and mod is the modulo operation. Another example of the Secondary Synchronization Sequence of length N can be generated as follows:

$$d_{SSS}(n) = (1 - 2 \cdot x(n_1)) \cdot (1 - 2 \cdot x(n_2)),$$
$$n_1 = \left(m + \frac{a}{c}M_1\right)\text{mod}N,$$

-continued $$n_2 = \left(m + \frac{b}{d}M_2\right)\text{mod}N_2,\ N_2 \le N,$$

where $n_1$, $n_2$, m, a, b, c, d, $N_1$ and N are all positive integer values and mod is the modulo operation.

After having detected (step 1915) the primary synchronization signal, the UE 110 may attempt to detect the secondary synchronization signals transmitted by the NT-TRP 172. From the values for the parameters, $\{C, M_1\}$, the UE 110 may generate a plurality of second sequences. Indeed, the UE 110 may generate a second sequence for each possible value for the parameter, $M_2=\{0,1, \ldots, C-1\}$. The UE 110 may compare each second sequence with a sequence received in the secondary synchronization signals transmitted (step 1918) by the NT-TRP 172. By way of this comparison, the UE 110 may determine a value for parameter $M_2$ that is associated with the strongest secondary synchronization signal. The UE 110 may be considered to have selected a beam associated with particular parameters $\{M_1, M_2\}$.

The signal flow diagram of FIG. 19 may be seen as representative of a beam selection mechanism that is integrated within an Initial Access procedure. Each individual narrow beam corresponds to specific PSS/SSS combination. The PSS sequence is common across a beam-group (with beam-group index, $M_1$) and the SSS sequence is unique for each beam (with beam index, $M_2$) within the beam-group.

Once the UE 110 has selected a suitable beam (identified using the pair, $\{M_1, M_2\}$), the UE 110 may initiate a Random Access procedure by transmitting a random access preamble.

The UE 110 may generate a sequence for the random access preamble as a function of $M_1$ and/or $M_2$. Transmitting, to the NT-TRP 172, a random access preamble with a sequence generated in this way may be seen to allow the UE 110 to provide, to the NT-TRP 172, feedback indicative of the selected beam. Accordingly, the NT-TRP 172 may then transmit a random access channel response to the UE 110 using the beam selected by the UE 110. An example sequence, $d_{RA}(m)$, that the UE 110 may use for the random access preamble may be obtained from the expression $d_{RA}(m)=x(m, M_1, M_2)$, where $x(\cdot)$ may, for example, be a Zadoff-Chu sequence. One example of the random access preamble sequence can be generated as follows:

$$d_{RA}(m) = x(m, M_1, M_2) = x_{ZC}\left(\left(m + \frac{a}{c}M_1 + \frac{b}{d}M_2\right)\text{mod}L\right) \text{ where } x_{ZC}(m) = e^{-j\frac{\pi u m(m+1)}{L}}$$

is the Zadoff-Chu sequence, m, a, b, c, d, u and L are all positive integer values, $$\left(\frac{a}{c}M_1 + \frac{b}{d}M_2\right)$$

can be interpreted as a cyclic shift. Another example of the random access preamble sequence can be generated as follows:

$$d_{RA}(m) = x(m, M_1, M_2) = x_{ZC}\left(\left(m + \left(\frac{a}{c}M_1\right)\cdot\left(\frac{b}{d}M_2\right)\right)\bmod L\right) \text{ where } x_{ZC}(m) = e^{-j\frac{\pi u m(m+1)}{L}}$$

is the Zadoff-Chu sequence, m, a, b, c, d, u and L are all positive integer values, $$\left(\frac{a}{c}M_1\right)\cdot\left(\frac{b}{d}M_2\right)$$

can be interpreted as a cyclic shift. L denotes the length of the random access preamble sequence. Another example of the random access preamble sequence can be generated as follows:

$$d_{RA}(m) = x(m, M_1, M_2) = x_{ZC}\left(\left(m + \left(\frac{a}{c}M_1\right)\right)\bmod L\right)\cdot x_{ZC}\left(\left(m + \left(\frac{b}{d}M_2\right)\right)\bmod L\right)$$

where $$x_{ZC}(m) = e^{-j\frac{\pi u m(m+1)}{L}}$$

is the Zadoff-Chu sequence, m, a, b, c, d, u and L are all positive integer values, $$\left(\frac{a}{c}M_1\right) \text{ and } \left(\frac{b}{d}M_2\right)$$

can be interpreted as cyclic shifts. L denotes the length of the random access preamble sequence.

In one embodiment, one or more NT-TRPs 172 transmit Positioning Reference Signals, such as those transmitted in GPS/Galileo/GLONASS/Beidou Global Navigation Satellite Systems, in a first frequency band and the one or more NT-TRPs 172 transmit Synchronization Signals, such as Primary Synchronization Signals (PSS) and/or Secondary Synchronization Signals (SSS), in a second frequency band. The UE 110 starts the Initial Access procedure by seeking the Positioning Reference Signals transmitted by the one or more NT-TRPs 172 in the first frequency band, in order to derive its position information. After having obtained its position information, the UE pursues the Initial Access procedure by seeking Synchronization Signals transmitted by one of the one or more NT-TRPs 172. Each of the PSS/SSS are transmitted by the NT-TRP 172 using certain transmit spatial beams and detected by the UE 110 using certain receive spatial beams. The UE selects the beam associated with the PSS/SSS detected as the strongest (based on their Reference Signal Received Power) and completes the Initial Access procedure by transmitting a Random Access Preamble towards the NT-TRP 172 based on the selected beam.

In another embodiment, one or more NT-TRPs 172 transmit Positioning Reference Signals, such as those transmitted in GPS/Galileo/GLONASS/Beidou Global Navigation Satellite Systems, and also transmit Synchronization Signals, such as Primary Synchronization Signals (PSS) and/or Secondary Synchronization Signals (SSS), in the same given frequency band. The UE 110 starts the Initial Access procedure by seeking the Positioning Reference Signals transmitted by the one or more NT-TRPs 172 in the first frequency band, in order to derive its position information. After having obtained its position information, the UE pursues the Initial Access procedure by seeking Synchronization Signals transmitted by one of the one or more NT-TRPs 172. Each of the PSS/SSS are transmitted by the NT-TRP 172 using certain transmit spatial beams and detected by the UE 110 using certain receive spatial beams. The UE selects the beam associated with the PSS/SSS detected as the strongest (based on their Reference Signal Received Power) and completes the Initial Access procedure by transmitting a Random Access Preamble towards the NT-TRP 172 based on the selected beam.

In some embodiments, the UE 110 has the capability of seeking Positioning Reference Signals, such as those transmitted in GPS/Galileo/GLONASS/Beidou Global Navigation Satellite Systems, in a given set of frequency bands supported by the NT-TRP 172 and it supports this capability in a "mandatory without capability signaling" manner, i.e., the UE 110 must support this capability and it doesn't signal this capability to the NT-TRP 172. This effectively allows the NT-TRP 172 to know that the UE 110 can derive its Position information using Positioning Reference signals transmitted by the NT-TRP 172.

In some embodiments, the UE 110 has the capability of seeking Positioning Reference Signals, such as those transmitted in GPS/Galileo/GLONASS/Beidou Global Navigation Satellite Systems, in a given set of frequency bands supported by the NT-TRP 172 for both GNSS-based navigation and communications purposes. The UE 110 supports this capability in a "mandatory without capability signaling" manner, i.e., the UE 110 must support this capability and it doesn't signal this capability to the NT-TRP 172. This effectively allows the NT-TRP 172 to know that the UE 110 can derive its Position information using Positioning Reference signals transmitted by the NT-TRP 172.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method for selecting a beam at a device, the method comprising:

obtaining location coordinates for the device;

determining, based on the location coordinates for the device, a selected beam index, from among a plurality of beam indices, the determining the selected beam index comprising:

determining, based on the location coordinates for the device, a beam-group index among a plurality of beam-group indices, a number of a group of beam indices corresponding to the beam-group index is greater than 1 and less than a number of beams corresponding to the plurality of beam indices, and determining the selected beam index from the group of beam indices corresponding to the beam-group index; and transmitting, based on the selected beam index, a random access preamble, wherein the determining the selected beam index from the group of beam indices comprises:

detecting a secondary synchronization signal (SSS) transmitted on the beam corresponding to the selected beam index; or wherein the determining the beam-group index comprises:

receiving a primary synchronization signal (PSS) from a non-terrestrial transmit-receive point, the PSS generated based on the beam-group index, and confirming the beam-group index based on the PSS.

2. The method of claim 1, further comprising:

prior to the obtaining the location coordinates for the device, receiving a positioning reference signal.

3. The method of claim 2, wherein the obtaining the location coordinates is based on the positioning reference signal.

4. The method of claim 1, wherein the determining the beam-group index comprises:

selecting the beam-group index from a table that maps location coordinate ranges to the plurality of beam-group indices.

5. The method of claim 1, further comprising:

receiving a positioning broadcast channel that includes a table that maps location coordinate ranges to the plurality of beam indices.

6. An apparatus, comprising:

at least one processor coupled with a non-transitory computer-readable medium storing instructions that, when executed by the at least one processor, cause the apparatus to perform operations including:

obtaining location coordinates for the apparatus;

determining, based on the location coordinates for the apparatus, a selected beam index, from among a plurality of beam indices, the determining the selected beam index comprising:

determining, based on the location coordinates for the apparatus, a beam-group index among a plurality of beam-group indices, a number of a group of beam indices corresponding to the beam-group index is greater than 1 and less than a number of beams corresponding to the plurality of beam indices, and determining the selected beam index from the group of beam indices corresponding to the beam-group index; and transmitting, based on the selected beam index, a random access preamble, wherein the determining the selected beam index from the group of beam indices comprises:

detecting a secondary synchronization signal (SSS) transmitted on a beam corresponding to the selected beam index; or wherein the determining the beam-group index comprises:

receiving a primary synchronization signal (PSS) from a non-terrestrial transmit-receive point, the PSS generated based on the beam-group index, and confirming the beam-group index based on the PSS.

7. The apparatus of claim 6, the operations further comprising:

prior to the obtaining the location coordinates for the apparatus, receiving a positioning reference signal.

8. The apparatus of claim 7, wherein the obtaining the location coordinates is based on the positioning reference signal.

9. The apparatus of claim 6, wherein the determining the beam-group index comprises:

selecting the beam-group index from a table that maps location coordinate ranges to the plurality of beam-group indices.

10. The apparatus of claim 6, the operations further comprising:

receiving a positioning broadcast channel that includes a table that maps location coordinate ranges to the plurality of beam indices.

11. A non-transitory computer-readable medium storing instructions that, when executed by an apparatus, cause the apparatus to perform operations comprising:

obtaining location coordinates for the apparatus;

determining, based on the location coordinates for the apparatus, a selected beam index, from among a plurality of beam indices, the determining the selected beam index comprising:

determining, based on the location coordinates for the apparatus, a beam-group index among a plurality of beam-group indices, a number of a group of beam indices corresponding to the beam-group index is greater than 1 and less than a number of beams corresponding to the plurality of beam indices, and determining the selected beam index from the group of beam indices corresponding to the beam-group index; and transmitting, based on the selected beam index, a random access preamble, wherein the determining the selected beam index from the group of beam indices comprises:

detecting a secondary synchronization signal (SSS) transmitted on a beam corresponding to the selected beam index; or wherein the determining the beam-group index comprises:

receiving a primary synchronization signal (PSS) from a non-terrestrial transmit-receive point, the PSS generated based on the beam-group index, and confirming the beam-group index based on the PSS.

12. The non-transitory computer-readable medium of claim 11, the operations further comprising:

prior to the obtaining the location coordinates for the apparatus, receiving a positioning reference signal.

13. The non-transitory computer-readable medium of claim 12, wherein the obtaining the location coordinates is based on the positioning reference signal.

14. The non-transitory computer-readable medium of claim 11, wherein the determining the beam-group index comprises:

selecting the beam-group index from a table that maps location coordinate ranges to the plurality of beam-group indices.

15. The method of claim 5, wherein the receiving the positioning broadcast channel comprises receiving a positioning information block indicating:

a location of the non-terrestrial transmit-receive point, the table, and synchronization signal burst configuration information.

16. The method of claim 1, wherein the random access preamble includes at least one of: at least one of an indication of the selected beam index or an indication of the beam-group index, or a sequence generated based upon at least one of the selected beam index or the beam-group index.

17. The apparatus of claim 6, wherein the random access preamble includes at least one of: at least one of an indication of the selected beam index or an indication of the beam-group index, or a sequence generated based upon at least one of the selected beam index or the beam-group index.

18. The non-transitory computer-readable medium of claim 11, wherein the random access preamble includes at least one of: at least one of an indication of the selected beam index or an indication of the beam-group index, or a sequence generated based upon at least one of the selected beam index or the beam-group index.

* * * * *